United States Patent
Wakamura et al.

(10) Patent No.: US 8,663,759 B2
(45) Date of Patent: Mar. 4, 2014

(54) PROTECTIVE BAG

(75) Inventors: Masato Wakamura, Kawasaki (JP); Katsuhiro Atsuma, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/440,418

(22) Filed: Apr. 5, 2012

(65) Prior Publication Data

US 2012/0288218 A1 Nov. 15, 2012

Related U.S. Application Data

(63) Continuation of application No. PCT/JP2010/067667, filed on Oct. 7, 2010.

(30) Foreign Application Priority Data

Oct. 9, 2009 (JP) .................................. 2009-234878

(51) Int. Cl.
*B29D 22/00* (2006.01)

(52) U.S. Cl.
USPC ............. 428/35.2; 383/105; 383/117; 442/96

(58) Field of Classification Search
USPC ............ 428/35.2, 701, 702; 502/208; 442/96; 383/105, 117
See application file for complete search history.

(56) References Cited

U.S. PATENT DOCUMENTS

| | | | |
|---|---|---|---|
| 5,532,043 A | 7/1996 | Terashi | |
| 5,567,231 A * | 10/1996 | Yokoo et al. | 96/153 |
| 6,265,064 B1 * | 7/2001 | Mori | 428/372 |
| 7,300,710 B2 * | 11/2007 | Aso et al. | 428/701 |
| 7,635,659 B2 * | 12/2009 | Naganuma et al. | 502/208 |
| 7,867,600 B2 * | 1/2011 | Makimura et al. | 428/151 |
| 2005/0170220 A1 | 8/2005 | Aso | |
| 2006/0217736 A1 * | 9/2006 | Kaneko et al. | 606/94 |
| 2007/0154378 A1 | 7/2007 | Aso et al. | |
| 2007/0212962 A1 * | 9/2007 | Makimura et al. | 442/96 |
| 2012/0288218 A1 * | 11/2012 | Wakamura et al. | 383/103 |

FOREIGN PATENT DOCUMENTS

| | | |
|---|---|---|
| CN | 100471569 | 3/2009 |
| JP | H06-009441 U | 2/1994 |
| JP | H06-320657 | 11/1994 |
| JP | 2002-191241 | 7/2002 |
| JP | 2002-204653 | 7/2002 |

(Continued)

OTHER PUBLICATIONS

International Search Report Issued for counterpart International Patent Application No. PCT/JP2010/067667 dated Jan. 11, 2011.

(Continued)

*Primary Examiner* — N. Edwards
(74) *Attorney, Agent, or Firm* — Kratz, Quintos & Hanson, LLP

(57) ABSTRACT

The disclosed protective bag contains an air-permeable bag, a photoreflecting material, and a photocatalytic material, where the photoreflecting material and the photocatalytic material are provided on an outer surface of the air-permeable bag. For example, an embodiment where the air-permeable bag has concave parts formed on the outer surface thereof, an embodiment where the photoreflecting material is colored fibers, and an embodiment where photoreflecting material contains first photoreflecting particles having a volume average particle size of 100 μm to 200 μm, and second photoreflecting particles having a volume average particle size of 1 μm to 5 μm are preferable.

10 Claims, 6 Drawing Sheets

(56) References Cited

FOREIGN PATENT DOCUMENTS

| | | |
|---|---|---|
| JP | 3499585 | 12/2003 |
| JP | 2006-112017 | 4/2006 |
| JP | 2007-307884 | 11/2007 |
| JP | 2009012803 A * | 1/2009 |
| WO | 2004-026470 | 4/2004 |

OTHER PUBLICATIONS

First Office Action received issued Jan. 14, 2013 from the State Intellectual Property Office of the People's Republic of China in counterpart application No. 201080045625 with English translation (11 pages).

Chinese application Office Action dated Aug. 9, 2013, in the corresponding Chinese patent No. 201080045625.X, with English translation.

* cited by examiner

PROTECTIVE BAG

CROSS-REFERENCE TO RELATED APPLICATIONS

This application is continuation of PCT/JP2010/067667 filed on Oct. 7, 2010, which is based upon and claims the benefit of priority of the prior Japanese Patent Application No. 2009-234878 filed on. Oct. 9, 2009, the entire contents of which are incorporated herein by reference.

FIELD

The embodiment discussed herein relates to a protective bag which protects agricultural products such as fruits from insects.

BACKGROUND

Ethylene gas, as a growth promoter, generated from agricultural products such as fruits is known to have an effect of enhancing maturing of the agricultural products. In particular, as to apples, a research reported that the generated ethylene gas causes the drop of fruits from branches.

In addition, the agricultural products generate ethylene gas even after harvesting. In a space of high concentration of ethylene gas, the maturing of the agricultural products is significantly accelerated, thus resulting in rotting.

It is consequently desirable to eliminate ethylene gas in order to prevent the agricultural products from dropping and to keep their freshness even after harvesting.

The related art conducts the removal of ethylene gas through the use of a multilayer-structure plastic film having a layer containing a photocatalyst as a surface layer (for example, refer to Japanese Patent Application Laid-Open (JP-A) No. 2007-307884). However, a portion of bottom surface side of an agricultural product wrapped therearound by the plastic film (to the base material side on which the agricultural product is placed) is difficult to be irradiated with the light for activating the photocatalyst, and thus there raises a problem of accelerating the maturing at the bottom surface side of the agricultural product, resulting in rotting. In addition, since the agricultural, product wrapped by the plastic film is hermetically sealed, the ethylene gas fills the space near the fruit to enhance the maturing.

Furthermore, there is provided a method for efficiently and surely decomposing or removing the ethylene gas by detecting the quantity of ethylene gas and by varying the amount of irradiation of ultraviolet (UV) light based on the quantity of ethylene gas, thus optimizing the active mass of the photocatalyst means (for example, refer to JP-A No. 2002-204653). Although the method can efficiently and surely perform decomposition and removal of the ethylene gas from the harvested agricultural products, the method has a problem of failing in preventing the fruit before harvesting from dropping.

With such a background, there has been an increasing need for a technology which can suppress the ethylene gas concentration before and after the harvesting of agricultural products.

SUMMARY

The disclosed protective bag contains an air-permeable bag, a photoreflecting material, and a photocatalytic material, wherein the photoreflecting material and the photocatalytic material are provided on an outer surface of the air-permeable bag.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS (Protective Bag)

Figure 1:
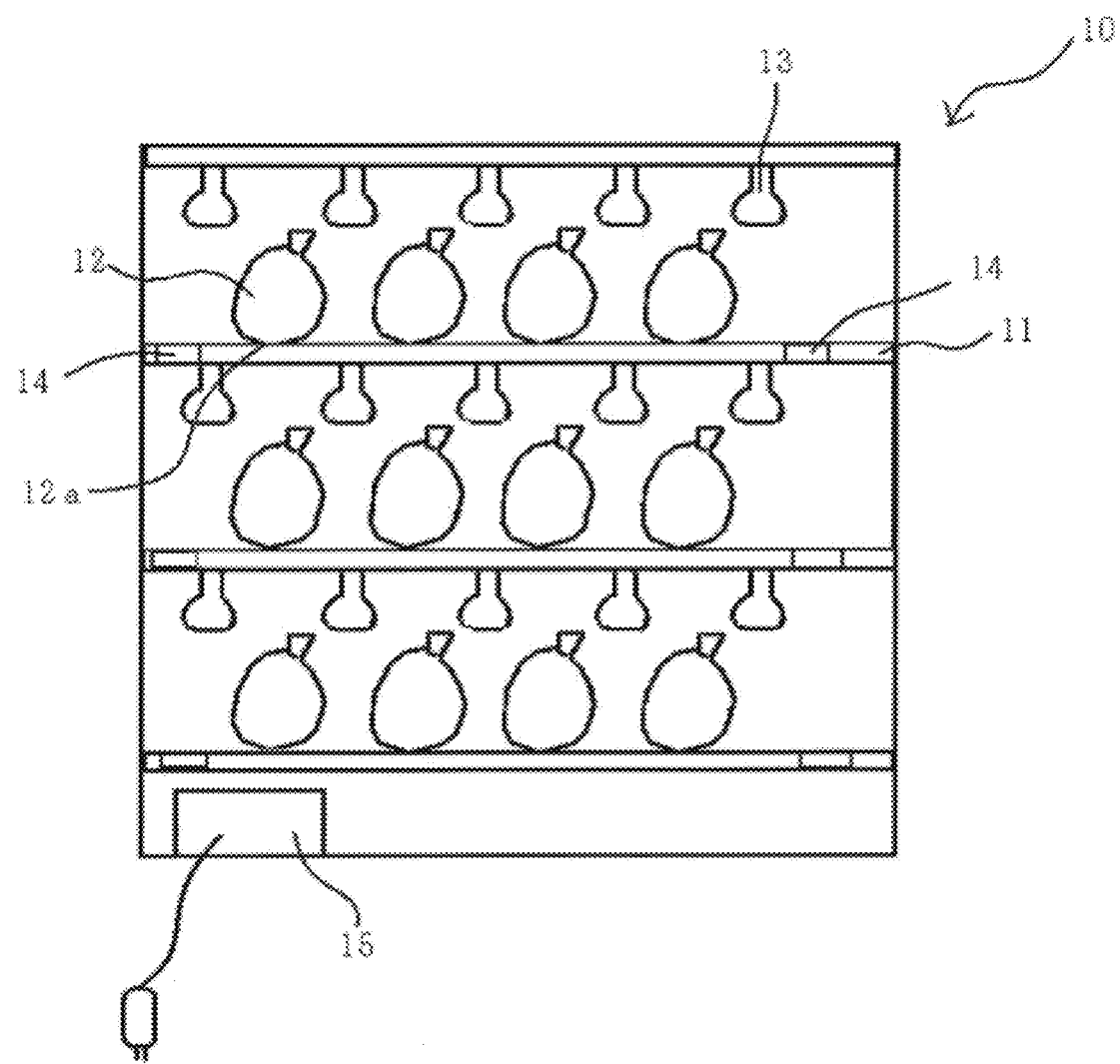
FIG. 1 illustrates a storage container which stores protective bags containing fruits.

The protective bag contains at least an air-permeable bag, a photoreflecting material, and a photocatalytic material where the photoreflecting material and photocatalytic material are provided on an outer surface of the air-permeable bag, and further formed by containing other mere as necessary.

<Air-Permeable Bag>

The air-permeable bag has no specific limitation as long as the protective bag is formed by disposing the photoreflecting material and the photocatalytic material on the outer surface of the air-permeable bag, and can be adequately selected depending on the purpose.

The shape of the air-permeable bag has no specific limitation, and can be adequately selected depending on the purpose. Examples of the shape thereof include sphere, cube, rectangular parallelepiped, and regular polyhedron.

Among these, spherical shape is preferable from the viewpoint of improved photoreflectance.

The air-permeable bag preferably has a bellows structure on the surface thereof from the viewpoint of improved handling properties, improved storage properties, and improved photoreflectance.

The bellows structure has no specific limitation as long as the surface thereof has convex parts (steps), and can be adequately selected depending on the purpose.

The width of the convex part (step) has no specific limitation, and can be adequately selected depending on the purpose. However, the width thereof is preferably in the range of 100 mm to 300 mm.

The height of the convex part (step) has no specific limitation, and can be adequately selected depending on the purpose. However, the height thereof is preferably in the range of 0.1 mm to 10 mm.

The arrangement of the convex parts (steps) has no specific limitation, and can be adequately selected depending on the purpose; including parallel arrangement.

The structure of the air-permeable bag has no specific limitation, and can be adequately selected depending on the purpose. However, preferably, concave parts are formed on an outer surface of the air-permeable bag in view of increasing the support quantity of photocatalytic material.

The shape of the concave part is preferably the one in which the coating quantity of the photocatalytic material is increased and the photocatalytic material is difficult to be eliminated. For example, the concave parts are formed by embossing using a needle-shaped member in which a plurality of conical projections is formed on a base material).

The diameter of the bottom surface of the conical projection has no specific limitation, and can be adequately selected depending on the purpose. However, the diameter thereof is preferably in the range of 0.5 µm to 1,000 µm.

The height of the conical projection has no specific limitation, and can be adequately selected depending on the purpose. The height thereof is, however, preferably in the range of 1 µm to 5,000 µm.

The density of the conical projections in the needle-shaped member has no specific limitation, and can be adequately selected depending on the purpose. However, the density thereof is preferably in the range of 1 projection/mm$^2$ to 10,000 projections/mm$^2$.

The number of the conical projections in the needle-shaped member has no specific limitation, and can be adequately selected depending on the purpose.

In addition, it is also preferable that the air-permeable bag be made of fibers each having an asymmetric structure, from the viewpoint of being capable of increasing the support quantity of the photocatalytic material.

The size of the air-permeable bag has no specific limitation as long as the size is the one capable of holding agricultural products such as fruits therein, and can be adequately selected depending on the purpose.

The material of the air-permeable bag has no specific limitation, and can be adequately selected depending on the purpose. Examples of the material thereof include nonwoven fabric, and fibers.

The nonwoven fabric has no specific limitation, and can be adequately selected depending on the purpose. The nonwoven fabric is manufactured by a known method.

The fibers have no specific limitation, and can be adequately selected depending on the purpose. Examples of the fibers include: natural fibers, such as cotton and hemp; synthetic fibers, such as acrylic fibers; and regenerated fibers, such as regenerated cellulose fibers and polyester fibers.

Among these fibers, acrylic-based synthetic fibers are preferred in view of weatherability.

The air-permeable performance of the air-permeable bag has no specific limitation, and can be adequately selected depending on the purpose. The performance thereof is, however, preferable to have 10 cm$^3$/m$^2$·day·atm or more.

When the air-permeable performance is less than 10 cm$^3$/m$^2$·day·atm, the gas may remain in the bag at a high concentration in some cases.

The air-permeable performance can be determined in the following procedure through the use of a gas permeability tester (Trade name GTR-11A/31A, manufactured by GTR TEC CORPORATION).

The concentration of the gas permeated under the pressure-difference method can be precisely analyzed and quantified by a gas chromatograph.

<<Photoreflecting Material>>

The photoreflecting material has no specific limitation as long as the material reflects light, and can be adequately selected depending on the purpose.

The embodiment of the photoreflecting material has no specific limitation, and can be adequately selected depending on the purpose. However, the photoreflecting material is preferably a fiber having metallic gloss and being woven in the gas-permeable bag, or a coating powder coated on the surface of the air-permeable bag.

The fibers having metallic gloss have no specific limitation, and can be adequately selected depending on the purpose. Examples of the fibers having metallic gloss include colored fibers which are colored by a known method such as dying and spray-coloring.

Shape, size, and specific gravity of the coating powder can be adequately selected.

The size of the coating powder has no specific limitation, and can be adequately selected depending on the purpose. The volume average particle size thereof is, however, preferably in the range of 0.05 µm to 5 µm.

When the volume average particle size is less than 0.05 µm, mechanical pulverizing is difficult in some cases. When the volume average particle size is larger than 5 µm, fixing the particle to the fiber becomes difficult in some cases.

Meanwhile, the volume average particle size can be determined by a particle size analyzer, and an example of the particle size analyzer preferably includes SALD-2100 LASER DIFFRACTION PARTICLE SIZE ANALYZER manufactured by SHIMADZU CORPORATION.

The specific gravity of the coating powder has no specific limitation, and can be adequately selected depending on the purpose.

The particle size distribution (distribution of particle diameter) of the coating powder has no specific limitation, and can be adequately selected depending on the purpose. For instance, more sharp particle size distribution (more narrow distribution), allows more homogeneously dispersing the photoreflecting material into water.

Furthermore, the coating powder preferably contains first photoreflecting particles each having a large volume average particle size and second photoreflecting particles each having a small volume average particle size, from the viewpoint of increasing the photoreflectance.

The first photoreflecting particles each having a large volume average particle size can increase the total photoreflecting area, while the second photoreflecting particles each having a small volume average particle size can enhance diffuse reflection, thereby improving the photoreflectance.

The volume average particle size of the first photoreflecting particles has no specific limitation, and can be adequately selected depending on the purpose. However, the volume average particle size thereof is preferably in the range of 1 µm to 5 µm.

When the volume average particle size thereof is smaller than 1 µm, the effect of the diffuse reflection is stronger than the effect of the mirror reflection in some cases. When the volume average particle size thereof exceeds 5 μm, the coating particle fails in being fixed to the fiber in some cases.

The volume average particle size of the second photoreflecting particles has no specific limitation, and can be adequately selected depending on the purpose. However, the volume average particle size thereof is preferably in 0.05 μm or larger but smaller than 1 μm.

When the volume average particle size thereof is smaller than 0.05 μm, mechanical pulverizing is difficult in some cases. When the volume average particle size thereof exceeds 1 μm, the effect of the mirror reflection is stronger than the effect of the diffuse reflection in some cases.

The material or the composition of the coating powder has no specific limitation, and can be adequately selected depending on the purpose. Examples of the material include: a metal such as aluminum, silver, or gold; micaceous iron oxide; zinc oxide; titanium oxide; cerium oxide; Prussian blue; titanium dioxide-coated mica; molybdenum white; and lithopone.

Among these, gold, micaceous iron oxide, and titanium oxide are preferable from the viewpoint of reflection efficiency and weatherability. Meanwhile, in the present invention, the photoreflecting materials can be used alone or in combination of two or more of them.

The coating method for the photoreflecting material has no specific limitation, and can be adequately selected depending on the purpose. Examples of the coating method include immersion method, and spray method.

The concentration of the photoreflecting material in the coating liquid used for the coating has no specific limitation, and can be adequately selected depending on the purpose. However, the concentration thereof is preferably in the range of 0.1% by mass to 20% by mass.

When the concentration of the photoreflecting material is less than 0.1% by mass, sufficient reflection effect cannot be attained in some cases. When the concentration thereof exceeds 20% by mass, the liquid viscosity becomes high, and thus the flowability of liquid necessary for immersion and spray is deteriorated in some cases.

Presence of the photoreflecting material on the outer surface of the protective, bag can be confirmed by, for example, determining the photoreflectance on the surface.

<<Photocatalytic Material>>

The photocatalytic material has no specific limitation as long as the material can be activated by irradiation of light, and the material can be adequately selected depending on the purpose.

The embodiment of the photocatalytic material is preferably a powder owing to the excellent contact efficiency with gaseous phytohormones such as ethylene gas, and the shape, the size, and the specific gravity thereof can be adequately selected.

In addition, it is preferable that the photocatalytic material further has a shape having a concave-convex surface, such as an echinulate shape. In that case, the surface area functioning as the photocatalyst increases, and thus the contact efficiency with ethylene gas further increases.

The size of the photocatalytic material has no specific limitation, and can be adequately selected depending on the purpose. However, the volume average particle size of the photocatalytic material is preferably 100 μm or smaller from the viewpoint of being able to widen the surface area functioning as the photocatalyst and to increase the contact efficiency with ethylene gas, and more preferably 5 μm or smaller from the viewpoint of being able to maintain a favorable dispersion state without precipitating the photocatalytic material, as a water-dispersion element dispersed in water. In addition, the lower limit of the volume average particle size is generally about 50 nm as the primary particle size, and is preferably 50 nm or more because the photocatalytic material having finer particle size than 50 nm is difficult to be manufactured.

When the volume average particle size thereof exceeds 100 μm, the surface area of the photocatalytic material cannot be significantly increased, and the contact properties with ethylene gas deteriorate in some cases. Meanwhile, the volume average particle size thereof can be determined by, for example, a particle size analyzer, and an example of the particle size analyzer preferably includes SALD-2100 LASER DIFFRACTION PARTICLE SIZE ANALYZER manufactured by SHIMADZU CORPORATION.

The specific gravity of the photocatalytic material has no specific limitation, and can be adequately selected depending on the purpose. However, smaller specific gravity is more preferable, and the photocatalytic material is preferably the one which can be suspended to circulate in the water-dispersion element without precipitating in the element.

The particle size distribution (distribution of particle diameter) of the photocatalytic material has no specific limitation, and can be adequately selected depending on the purpose. For instance, more sharp particle size distribution (more narrow distribution) allows more homogeneously dispersing the photocatalytic material into the water.

The light wavelength for inducing the photocatalytic activity of the photocatalyst in the photocatalytic material has no specific limitation, and can be adequately selected depending on the purpose. However, a preferable light wavelength is a level of exhibiting absorbability to the light in a broad band, such as UV light, and visible light, and of being able to generate the photocatalytic activity, because the cultivation of the agricultural products is mainly conducted under solar-light irradiation condition.

Although the specific material and composition of the photocatalytic material have no specific limitation, and can be adequately selected depending on the purpose, apatite having photocatalytic activity (photocatalytic performance) is preferably included. When the photocatalytic material is apatite having photocatalytic activity; the excellent adsorption characteristic of the apatite provides an advantage in that the adsorption characteristics to the ethylene gas are excellent. Furthermore, the photocatalytic activity (photocatalytic performance) thereof provides an advantage in that the adsorbed ethylene gas is capable of being efficiently decomposed and removed by the photocatalytic activity.

Among these photocatalytic materials, a preferable one is formed by containing at least apatite having photocatalytic activity, and more preferable one is formed by further containing a visible light-absorbing metal atom, and a UV light-absorbing metal atom. When the photocatalytic material is formed by containing the visible light-absorbing metal atom, the material provides an advantage of being suitably applicable under daily use condition such as under luminescence lamp. When the photocatalytic material contains the UV light-absorbing metal atom, the material provides an advantage of being suitably applicable under irradiation condition of light including UV light, such as solar light.

Meanwhile, in the present invention, the photocatalytic materials can be used alone or in combination of two or more of them.

The apatite having the photocatalytic activation (photocatalytic performance) has no specific limitation as long as the apatite has photocatalytic activity, and can be adequately selected depending on the purpose. However, a preferable apatite includes the one having a metal atom used for exhibiting the photocatalytic activity (hereinafter, the metal atom may be referred to as the "metal atom capable of inducing the photocatalytic activity"). When the apatite has a metal atom used for exhibiting the photocatalytic activity, irradiation of the apatite with light activates the apatite owing to the action of the metal atom used for exhibiting the photocatalytic activity, which makes it possible to remove the electrons from the ethylene gas (decomposition target) being adsorbed on the surface of the apatite, and makes it possible to oxidize and decompose the ethylene gas.

The apatite has no specific limitation, and can be adequately selected from known ones. Preferable apatites include the ones represented by the general formula (1).

$$A_m(BO_n)_Z X_S \qquad \text{General formula (1)}$$

In the general formula (1), the symbol A represents a metal atom, and the metal atom has no specific limitation and can be adequately selected depending on the purpose. For example, the metal atom includes calcium (Ca), aluminum (Al), lanthanum (La), magnesium (Mg), strontium (Sr), barium (Ba), lead (Pb), cadmium (Cd), europium (Eu), yttrium (Y), cerium (Ce), sodium (Na), and potassium (K). Among these, calcium (Ca) is specifically preferred owing to the superior adsorbability.

The symbol B designates one of phosphorus atom (P) and sulfur atom (S). Among these, phosphorus atom (P) is preferred owing to the superior biocompatibility. When the photocatalytic material containing phosphorus is the apatite, the symbol B is phosphorus atom (P). Also in this case, an apatite in which B is sulfur atom (S) can be used in combination.

The symbol O designates oxygen atom.

The symbol X designates any of hydroxyl group (OH), $CO_3$, and halogen atom. Among these, hydroxyl group (OH) is specifically preferred because the hydroxyl group can form a photocatalytic partial structure of metal oxide type together with the metal atom of A.

Examples of the halogen atom are fluorine atom, chlorine atom, bromine atom, and iodine atom.

The symbols m, n, z, and s represent integer. From the viewpoint of giving good charge balance, m is preferably in the range of 8 to 10, n is preferably in the range of 3 to 4, z is preferably in the range of 5 to 7, and a is preferably in the range of 1 to 4.

Examples of the apatite represented by the general formula (I) are hydroxyapatite, fluoroapatite, chloroapatite, and their metal salt, tricalcium phosphate, and calcium hydrogen phosphate. Among these, preferred one is a hydroxyapatite of the general formula (1) with hydroxyl group (OH) as X, and specifically preferred one is a calcium hydroxyapatite (Ca-HAP) in which A of the general formula (1) is calcium (Ca), B thereof is phosphorus atom (P), and X thereof is hydroxyl group (OH), or $Ca_{10}(PO_4)_6(OH)_2$.

Since the above calcium hydroxyapatite (CaHAP) is easily ion-exchanged with cation and anion, the calcium hydroxyapatite (CaHAP) is preferable in terms of superior absorption characteristics to ethylene gas (decomposition target).

The amount of the apatite in the photocatalytic material has no specific limitation, and can be adequately selected depending on the purpose. For example, a preferable amount thereof is in the range of 85% by mole to 97% by mole, and more preferable amount thereof is in the range of 85% by mole to 90% by mole.

If the amount of the apatite is less than 85% by mole, the photocatalytic activity of the photocatalytic material is insufficient in some cases. Even when the amount thereof exceeds 97% by mole, no effect corresponding to the increased amount can be obtained, and the adsorption characteristics of the photocatalytic material to the ethylene gas (decomposition target), and the photocatalytic activity thereof deteriorate in some cases.

Meanwhile, the amount of the apatite in the photocatalytic material can be determined by, for example, quantitative analysis by ICP-AES.

The metal atom necessary to have the photocatalytic activity has no specific limitation as long as the metal atom can function as the photocatalyst center, and can be adequately selected from the known ones having photocatalytic activity depending on the purpose. However, from the viewpoint of superior photocatalytic activity, there is preferably included at least one atom selected from the group consisting of titanium (Ti), zinc (Z), manganese (Mn), tin (Sri), indium an), and iron (Fe). Among these, titanium (Ti) is preferable owing to the specifically superior photocatalytic activity (photocatalytic performance).

With the photocatalyst containing titanium (Ti), normally a light having a short wavelength of about 360 nm or less excites titanium (Ti) to induce the photocatalytic activity.

The amount of the metal atom necessary to have the photocatalytic activity in the photocatalytic material has no specific limitation, and can be adequately selected depending on the purpose. For example, the amount thereof is preferably in the range of 5% by mole to 15% by mole relative to the entire quantity of metal atoms in the photocatalytic material, and more preferably from 8% by mole to 12% by mole.

When the amount of the metal atom necessary to have the photocatalytic activity is less than 5% by mole, the photocatalytic activity of the photocatalytic material is insufficient in some cases. When the amount thereof exceeds 15% by mole, no effect corresponding to the increased amount can be obtained, and the adsorption characteristics of the photocatalytic material to the decomposition target, and the photocatalytic activity thereof deteriorate in some cases.

Meanwhile, the amount of the metal atom necessary to have the photocatalytic activity in the photocatalytic material can be determined by, for example, quantitative analysis by ICP-AES.

The metal atom necessary to have the photocatalytic activity is taken into (substitutes for a part of) the crystal structure of the apatite as a part of the metal atoms constituting the crystal structure of the apatite, and thus there is formed a "photocatalytic partial structure", which can exert the photocatalytic function, within the crystal structure of the apatite.

The apatite having such a photocatalytic partial structure has a photocatalytic activity, and the apatite structure portion exhibits superior adsorption characteristics, thus exhibits superior adsorption characteristics for ethylene gas (decomposition target) as compared with known metal oxides having photocatalytic activity.

As the apatite having above-described photocatalytic activity, an adequately synthesized one may be used, and a commercially available one may be used.

Figure 2:
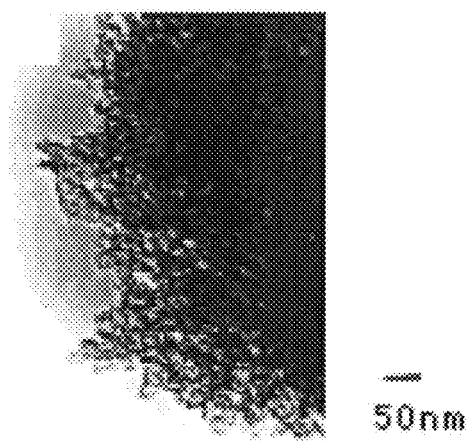
FIG. 2 illustrates an example of photocatalytic titanium apatite and is the electron micrograph.

The commercially available apatite having the photocatalytic activity preferably includes, for example, PCAP-100 (trade name of the product of TAIHEI CHEMICAL INDUSTRIAL CO., LTD.) as the above-described calcium titanium hydroxyapatite. FIG. 2 shows an electron microscope photograph of the secondary particles of PCAP-100. As shown in the photograph of FIG. 2, nano-order fine primary particles agglomerate to form spherical secondary particles.

The visible light-absorbing metal atom has no specific limitation, and can be adequately selected depending on the purpose. For example, the one having absorption characteristics to a light having 400 nm or larger wavelength is preferably included, and specifically, at least one selected from chromium (Cr) and nickel (Ni) is more preferable. From the viewpoint of enabling the recognition of a state of photocatalytic activity of the photocatalytic material, by visual inspection, chromium (Cr) is preferred because chromium (Cr) can vary the color from pale yellow to pale blue, further from pale blue to dark blue, depending on the state of the photocatalytic activity.

The amount of the visible light-absorbing metal atom in the photocatalytic material has no specific limitation, and can be adequately selected depending on the purpose. For example, a preferable amount thereof relative to the entire metal atoms is in the range of 0.001% by mole to 1% by mole, and more preferably from 0.01% by mole to 1% by mole.

When the amount of the visible light-absorbing metal atom is less than 0.001% by mole, the absorbability of visible light of the photocatalytic material is insufficient in some cases. When the amount thereof exceeds 1% by mole, the effect corresponding to the increased amount cannot be obtained, and the absorbability of the photocatalytic material to the ethylene gas (decomposition target) deteriorates in some cases.

The amount of the visible light-absorbing metal atom in the photocatalytic material can be determined by, for example, a quantitative analysis by ICP-AES.

The UV light-absorbing metal atom has no specific limitation, and can be adequately selected depending on the purpose. From the viewpoint of not-saturating the visible light absorbability and the UV light absorbability of the photocatalytic material, at least one of tungsten (W) and vanadium (V) is preferable as the UV light-absorbing metal atom. These atoms may be contained alone or in combination of two or more of them, in the photocatalytic material.

The amount of the UV light-absorbing metal atom in the photocatalytic material is preferably in the range of 0.001% by mole to 0.1% by mole relative to entire metal atoms.

When the amount of the UV light-absorbing metal atom is less than 0.001% by mole, the absorbability of UV light of the photocatalytic material is insufficient in some cases. When the amount thereof exceeds 0.1% by mole, the effect corresponding to the increased amount cannot be obtained, and the adsorptivity of the photocatalytic material to the ethylene gas (decomposition target) deteriorates, or the absorbability of visible light deteriorates in some cases.

The amount of the 15V light-absorbing metal atom in the photocatalytic material can be determined by, for example, a quantitative analysis by ICP-AES.

In the photocatalytic material, the sum of the amount of the metal atom necessary to have the photocatalytic activity, the UV light-absorbing metal atom, and the visible light-absorbing metal atom has no specific limitation, and can be adequately selected depending on the purpose. However, for example, the sum thereof is preferably 15% by mole or less, and more preferably in the range of 3% by mole to 15% by mole.

If the sum of the amount thereof exceeds 15% by mole, there cannot be obtained the effect of improving the photocatalytic activity, corresponding to the increased amount, and inversely the photocatalytic activity deteriorates in some cases.

As a specific example of the photocatalytic material, the metal atom necessary to provide the photocatalytic activity is titanium (Ti), and the apatite is preferably calcium hydroxyapatite (CaHaP), $Ca_{10}(PO_4)_6(OH)_2$. The one in which the visible light-absorbing metal atom is further contained and the visible light-absorbing metal atom is chromium (Cr), and the one in which the UV light-absorbing metal atom is further contained, and the UV light-absorbing metal atom is at least any of tungsten (W) and vanadium (V), and the like are more preferable.

Such photocatalytic materials have excellent adsorption performance of the ethylene gas (decomposition target).

Furthermore, when the photocatalytic material contains the visible light-absorbing metal atom, the photocatalytic material can absorb visible light, exhibits a wide band of photoabsorbability, provides excellent light-use efficiency, thus being able to be favorably used in the application under irradiating conditions with varieties of kinds of lights, for example irradiation condition with solar ray. The photocatalytic material does not saturate the photocatalytic activity, exhibiting excellent photocatalytic activity over a long period of time; specifically even under a condition of irradiation with visible light over a long period of time, the photocatalytic activity is not saturated, thereby having an advantage of being able to sustain the excellent photocatalytic activity (photocatalytic performance).

Moreover, when the photocatalytic material contains the UV light-absorbing metal atom, the material can absorb UV light, exhibits a wide band of photoabsorbability provides excellent light-use efficiency, thereby being able to be favorably used in the application under irradiating conditions with varieties of kinds of lights, for example irradiation condition with solar ray. The photocatalytic material does not saturate the photocatalytic activity, giving excellent photocatalytic activity over a long period of time; specifically even under a condition of long period irradiation with UV light, the photocatalytic activity is not saturated, thereby having an advantage of being able to sustain the excellent photocatalytic activity (photocatalytic performance).

Examples of the structure of the photocatalytic material include single layer structure, layered structure, porous structure, and core-shell structure.

Meanwhile, identification of the photocatalytic material and observation of the morphology of the photocatalytic material can be performed by, for example, TEM, XRD, XPS, and FT-IR.

The volume average particle size of the secondary particles of the apatite having the photocatalytic activity is preferably in the range of 1 μm to 10 μm.

The primary particles (single crystals) of the apatite having the photocatalytic activity preferably have a particle size distribution ranging from 10 nm to 1 μm.

It is preferable that the apatite having the photocatalytic activity and having such a range of particle size is dispersed in water so that the solid content becomes 0.001% by mass to 40% by mass, more preferably from 0.1% by mass to 20% by mass and so that the immersion liquid for the protective bag (photocatalytic material-water dispersion element) for supporting the photocatalytic material on the protective bag is prepared. Meanwhile, the lower limit of the solid content of the apatite having the photocatalytic activity (the photocatalytic material) in water is preferably 0.001% by mass or more from the viewpoint of enabling the protective bag to support the photocatalytic material and of attaining sufficient photocatalytic effect.

The photocatalytic material can be manufactured by a known method. For example, the photocatalytic material containing the visible light-absorbing metal atom and the UV light-absorbing metal atom can be manufactured by doping the visible light-absorbing metal atom and the UV light-absorbing metal atom into the apatite having the photocatalytic activity.

The aspect of the doping has no specific limitation, and can be adequately selected depending on the purpose. Examples of the doping can include substitution, chemical bonding, adsorption and the like. Among these, substitution is preferable in that the control of reaction is easy, the elimination or the like of the visible light-absorbing metal atom, the UV light-absorbing metal atom and the like is not carried out after being doped, and these metal atoms are capable of being stably held in the photocatalytic material.

The aspect of the substitution has no specific limitation, and can be adequately selected depending on the purpose. For example, when an apatite containing metal atom necessary to have the photocatalytic activity is used as the apatite having the photocatalytic activity, an aspect is preferably included, in which at least a part of the metal atoms is substituted with the visible light-absorbing metal atom, the UV light-absorbing metal atom, and the like. The aspect is advantageous because the visible light-absorbing metal atom, the UV light-absorbing metal atom, and the like are held so as not to be separated therefrom by the apatite.

The kind of the substitution with the visible light-absorbing metal atom, the UV light-absorbing metal atom, and the like has no specific limitation, and can be adequately selected depending on the purpose. For example, ion exchange and the like are preferred. When the substitution corresponds to an ion exchange, the substitution is advantageous owing to the excellent substitution efficiency.

The specific method for doping, or the specific method for doping of the visible light-absorbing metal atom, the UV light-absorbing metal atom, and the like into the apatite having the photocatalytic activity has no specific limitation, and can be adequately selected depending on the purpose. For example, there are preferably included: the immersion method, in which the apatite having a metal atom necessary to have the photocatalytic activity is immersed in an aqueous solution in which the visible light-absorbing metal atom, the UV light-absorbing metal atom, and the like are dissolved (caused to exist); the coprecipitation method, in an aqueous solution in which a raw material of apatite having a metal atom necessary to provide the photocatalytic activity, the visible light-absorbing metal atom, the meal atom absorbing UV light, and the like are dissolved (caused to coexist), the raw material, the visible light-absorbing metal atom, the UV light-absorbing metal atom, and the like are coprecipitated; and the other methods.

Although the aqueous solution may be allowed to stand, agitation of the aqueous solution is preferable because the substitution is carried out efficiently. The agitation can be performed by a known apparatus and a known unit, such as using magnetic stirrer and an agitator. As for these methods, the immersion method is more preferable because the simple operation is possible.

Meanwhile, the immersion method may be carried out by immersing the apatite having a metal atom necessary to provide the photocatalytic activity into an aqueous solution in which the visible light-absorbing metal atom, the UV light-absorbing metal atom, and the like are dissolved (caused to coexist). Inversely, the immersion method may be carried out by dissolving the visible light-absorbing metal atom, the UV light-absorbing metal atom, and the like into an aqueous solution in which the apatite containing metal atom necessary to have the photocatalytic activity is dispersed.

In addition, in the above manufacturing examples, the apatite having the photocatalytic activity is used as the starting material. Instead of the above apatite, there may be used both the apatite and the metal atom necessary to have the photocatalytic activity as the starting materials, and the metal atom necessary to have the photocatalytic activity may be doped into the apatite at the same time as, or prior to the doping of the visible light-absorbing metal atom, the UV light-absorbing metal atom, and the like. In this case, the doping of the visible light-absorbing metal atom, the UV light-absorbing metal atom, and the like, and the formation of the apatite having the photocatalytic activity are carried out at the same time, or the doping of the visible light-absorbing metal atom, the UV light-absorbing metal atom, and the like is carried out after the formation of the apatite having the photocatalytic activity.

In the case of the aspect in which the apatite having the photocatalytic activity is used as the starting material, the calcium titanium hydroxyapatite (TiHAP) in which Ti is doped in advance can be preferably used as the apatite having the photocatalytic activity.

The concentration of the apatite containing the metal atom necessary to have the photocatalytic activity in the aqueous solution in the doping has no specific limitation, and can be adequately selected depending on the purpose. For example, a preferable concentration thereof is in the range of 0.3% by mass to 1.0% by mass, and more preferably from 0.4% by mass to 0.6% by mass.

When the amount of the apatite is less than 0.3% by mass, the photocatalytic activity deteriorates in some cases. Even if the amount thereof exceeds 1.0% by mass, there cannot be obtained the effect of improving the photocatalytic activity, corresponding to the increased amount, and inversely the photocatalytic activity deteriorates in some cases.

The concentration of the visible light-absorbing metal atom in the aqueous solution in the doping has no specific limitation, and can be adequately selected depending on the purpose. For example, the concentration thereof is preferably in the range of $1\times10^{-4}$ M to $1\times10^{-3}$ M, and more preferably from $1\times10^{-4}$ M to $5\times10^{-4}$ M.

If the concentration of the visible light-absorbing metal atom is less than $1\times10^{-4}$ M, the responsiveness to visible light deteriorates in some cases. Even if the concentration thereof exceeds $1\times10^{-3}$ M, there cannot be obtained the effect of improving the responsiveness to visible light, corresponding to the increased amount, and inversely the responsiveness to visible light deteriorates in some cases.

The concentration of the UV light-absorbing metal atom in the aqueous solution in the doping has no specific limitation, and can be adequately selected depending on the purpose. For example, the concentration thereof is preferably in the range of $1\times10^{-3}$ M to $1\times10^{-2}$ M, and more preferably from $9\times10^{-3}$ M to $1\times10^{-2}$ M.

If the concentration of the UV light-absorbing metal atom is less than $1\times10^{-3}$ M, the photocatalytic activity to UV light deteriorates in some cases. Even if the concentration thereof exceeds $1\times10^{-2}$ M, there cannot be obtained the effect of improving the photocatalytic activity, corresponding to the increased amount, and inversely the activity to UV light deteriorates in some cases.

The embodiment of the visible light-absorbing metal atom (the UV light-absorbing metal atom) being immersed in the aqueous solution in the doping is preferably a salt or a hydrate of the visible light-absorbing metal atom (the UV light-absorbing metal atom) in view of the ease of dissolution in the aqueous solution and of the ease of adjusting the concentration of the visible light-absorbing metal atom (the UV light-absorbing metal atom) in the aqueous solution, and the like.

The salt or the hydrate have no specific limitation, and can be adequately selected depending on the purpose. For example, when the visible light-absorbing metal atom is chromium (Cr) and nickel (Ni), there is preferred a salt containing at least one selected from chromium (Cr) and nickel (Ni), and specifically preferred ones are nitrate and ammonium salt because chloride and sulfate deteriorate the photocatalytic activity in some cases.

The reaction system performing the doping has no specific limitation, and can be adequately selected depending on the purpose. For example, the doping can be performed in liquid, air or the like. A preferable reaction system is, however, liquid.

In this case, the liquid has no specific limitation, and can be adequately selected depending on the purpose. However, water or a liquid composed mainly of water is preferable.

The container holding the liquid has no specific limitation, and can be adequately selected among known ones. For example, preferred container includes mixer, agitator, and the like for large-scale operation, and beaker for small-scale operation.

The condition of the doping has no specific limitation, and the temperature, the time, the pressure, and the like can be adequately selected depending on the purpose.

The temperature has no specific limitation, varies depending on kind, quantity ratio, and the like of the material, and thus cannot necessarily be specified. For example, the temperature is normally in the range of about 0° C. to about 100° C., and is preferably room temperature (ranging from 20° C. to 30° C.). The time has no specific limitation, varies depending on kind, quantity ratio, and the like of the material, and thus cannot necessarily be specified. For example, the time is normally in the range of about 10 seconds to about 30 minutes, and is preferably from 1 minute to 1.0 minutes. The pressure has no specific limitation, varies depending on kind, quantity ratio, and the like of the material, and thus cannot necessarily be specified. However, the pressure is preferably atmospheric pressure.

The amount of the metal necessary to provide the photocatalytic activity; the amount of visible light-absorbing metal atom, the amount of meal atom absorbing UV light, and the like in the photocatalytic material can be controlled to the respective desired values by adequately regulating the addition amount (M) of them or by adequately regulating the conditions.

The firing is a process in which, after doping the visible light-absorbing metal atom, the UV light-absorbing metal atom, and the like, into the apatite having the photocatalytic activity (after the doping process), the apatite having completed the doping is fired at a temperature in the range of 600° C. to 800° C.

If the firing temperature is lower than 600° C., the photocatalytic activity cannot be maximized in some cases. If the firing temperature is higher than 800° C., decomposition may occur in some cases.

The firing conditions such as time, atmosphere, pressure, and apparatus have no specific limitation, and can be adequately selected depending on the purpose. The time differs with the amount of apatite having completed the doping, and the like, and cannot necessarily be specified. For example, however, the time is preferably 1 hour or longer, and more preferably 1 hour to 2 hours. The atmosphere includes an inert gas atmosphere such as nitrogen and argon, or an atmospheric environment. Atmospheric environment is preferable. The pressure includes, for example, atmospheric pressure. As the apparatus, a known firing apparatus can be used.

By carrying out the firing, there can be increased the crystallinity of the apatite having the photoabsorption activity, being doped with the visible light-absorbing metal atom, the UV light-absorbing metal atom, and the like, and thus there can be further increased the photocatalytic activity (including adsorption characteristic and photocatalytic activity) in the photocatalytic material.

An example of the method for manufacturing the photocatalytic material is described below. When the doping is done by substitution, specifically when the substitution is performed by the coprecipitation method through the ion-exchange, there are blended a pure water treated to remove carbon-dioxide gas with, for example, an aqueous solution of calcium nitrate of calcium hydroxyapatite (CaHAP) as the apatite, an aqueous solution of titanium sulfate containing titanium for doping the titanium as the visible light-absorbing metal atom into the CaHAP, an aqueous solution of chromium nitrate containing chromium as the visible light-absorbing metal atom, and an aqueous solution of n-hydrate of 12 tungstrinic acid containing tungsten as the UV light-absorbing metal atom, at a specific mixing ratio. To thus prepared mixture, phosphoric acid is added, and further ammoniac water is added to adjust pH to 9. Thus obtained suspension is aged at 100° C. for 6 hours (aging and crystal growth), which is then filtered. The precipitate is washed with pure water and is dried. After that, the dried cake is heated to 650° C. for 1 hour for firing. Thus, there was produced the TiHAP powder (photocatalytic material) doped with vanadium (V) as the UV light-absorbing metal atom and chromium (Cr) as the visible light-absorbing metal atom.

When the doping is done by substitution, specifically when the substitution is performed by the immersion method through the ion-exchange, first, a 9-hydrate of chromium (III) nitrate containing chromium as the visible light-absorbing metal atom is dissolved in pure water to prepare an aqueous solution of chromium nitrate. A necessary quantity of the calcium titanium hydroxyapatite (TiHAP) as the apatite containing the metal atom (titanium) necessary to provide the photocatalytic activity is weighed to put it in a beaker. Then, the aqueous solution of chromium nitrate is added to the contents of the beaker. After agitating the mixture for 5 minutes using a magnetic stirrer, the mixture is filtered by suction using a filter paper applying an aspirator, and the cake is washed with pure water, followed by drying the cake in an oven at 100° C. for 2 hours to obtain the TiHAP powder doped with the visible light chromium. Subsequently, an ammonium vanadate containing vanadium as the UV light-absorbing metal atom is dissolved in pure water to produce an aqueous solution of ammonium vanadate. The chromium-doped TiHAP is weighed to put it in a beaker, and the aqueous solution of ammonium vanadate is added to the contents of the beaker. After agitating the mixture using a magnetic stirrer, the mixture is filtered by suction using a filter paper applying an aspirator, and the cake is washed with pure water, followed by drying in an oven at 100° C. for 2 hours. Then, the case is fired in a muffle furnace at 650° C. for 1 hour (in atmospheric environment). Thus, there is produced the photocatalytic material composed of the TiHAP powder doped with the chromium as the visible light-absorbing metal atom and with the vanadium as the UV light-absorbing metal atom (apatite having the metal atom necessary to provide the photocatalytic activity).

The method for coating the photocatalytic material has no specific limitation, and can be adequately selected depending on the purpose. However, for example, immersion method and spray method are applied.

The concentration of the photocatalytic material in the coating liquid used in the coating process has no specific limitation, and can be adequately selected depending on the purpose. However, the concentration thereof is preferably in the range of 0.001% by mass to 50% by mass, and more preferably from 0.001% by mass to 20% by mass.

When the concentration of the photocatalytic material is less than 0.001% by mass, sufficient photocatalytic activity cannot be attained in some cases. When the concentration thereof exceeds 50% by mass, rapid increase in the viscosity prohibits coating in some cases.

The presence of the photocatalytic material on an outer surface of the protective bag can be confirmed by, for example, X-ray fluorescence analysis.

Presence of a large quantity of the photocatalytic material at the bottom surface side of the protective bag is preferred because the photocatalytic activity is improved at the bottom surface side where the light is difficult to irradiate thereto.

<<Mass Ratio of the Photoreflecting Material to the Photocatalytic Material>>

The mass ratio of the photoreflecting material to the photocatalytic material has no specific limitation, and can be adequately selected depending on the purpose. However, for example, the mass ratio thereof is preferably in the range of 5/95 to 95/5, more preferably from 30/70 to 70/30, and particularly 50/50.

When the mass ratio thereof is smaller than 5/95, sufficient photoreflection efficiency cannot be attained in some cases. When the mass ratio thereof is larger than 95/5, sufficient photocatalytic effect cannot be attained in some cases. In contrast, when the mass ratio thereof is in a specifically preferred range, the mass ratio is advantageous in terms of good balance between the reflection efficiency and the photocatalytic effect.

<<Quantity of the Photocatalytic Material in the Protective Bag>>

The quantity of the photocatalytic material in the protective bag has no specific limitation, and can be adequately selected depending on the purpose. The quantity thereof is, however, preferably in the range of 5% by mass to 95% by mass to the sum of the quantity of the photocatalytic material and the quantity of the photoreflecting material, more preferably from 30% by mass to 70% by mass, and particularly 50% by mass.

When the quantity of the photocatalytic material is less than 5% by mass to the sum of the quantity of the photocatalytic material and the quantity of the so photoreflecting material, sufficient photocatalytic effect cannot be attained in some cases. When the quantity thereof exceeds 95% by mass, sufficient photoreflection effect cannot be obtained in some cases. In contrast, if the quantity of the photocatalytic material is in a specifically preferred range, the quantity is advantageous in terms of good balance between the photocatalytic effect and the photoreflection effect.

The quantity of the photocatalytic material in the protective bag can be determined using ICP-AES (trade name OPTIMA3000, manufactured by PERKIN ELMER, INC.) in accordance with the following procedure.

The quantity of the photocatalytic material can be calculated by dissolving the photocatalytic material adhered to the protective bag in dilute nitric acid, and then by quantitatively determining the components.

<<Quantity of the Photoreflecting Material in the Protective Bag>>

The quantity of the photoreflecting material in the protective bag has no specific limitation, and can be adequately selected depending on the purpose. However, the quantity thereof is preferably in the range of 5% by mass to 95% by mass to the sum of the quantity of the photocatalytic material and the quantity of the photoreflecting material, more preferably from 30% by mass to 70% by mass, and particularly 50% by mass.

When the quantity of the photocatalytic material is less than 5% by mass to the sum of the quantity of the photocatalytic material and the quantity of the photoreflecting material, sufficient photoreflection effect cannot be attained in some cases. When the quantity thereof exceeds 95% by mass, sufficient photocatalytic effect cannot be obtained in some cases.

The quantity of the photoreflecting material in the protective bag can be determined using ICP-AES (trade name OPTIMA3000, manufactured by PERKIN ELMER, INC.) in accordance with the following procedure.

The quantity of material can be calculated by dissolving the photocatalytic material adhered to the protective bag in dilute nitric acid, and then by quantitatively determining the components.

<<Photoreflectance of the Protective Bag>>

The photoreflectance of the protective bag has no specific limitation, and can be adequately selected depending on the purpose. The photoreflectance is, however, preferably in the range of 30% to 59%, more preferably from 60% to 89%, and particularly from 90% to 100%.

If the photoreflectance is less than 30%, efficient diffuse reflection is not performed in some cases. In contrast, if the photoreflectance is in a specifically preferable range, almost all the lights advantageously perform diffuse a reflection efficiently.

Meanwhile, the photoreflectance of the protective bag can be determined by using UV-VIS (trade name V530, manufactured by JASCO CORPORATION) in accordance with the following procedure.

The fiber of protective bag is set in a spectroscope through the use of an attachment for determining thin-film reflection, and then the reflectance to a reference mirror can be determined.

<<Permeability of Protective Bag to Ethylene Gas>>

The permeability of the protective bag to ethylene gas has no specific limitation, and can be adequately selected depending on the purpose. The permeability thereof is, however, preferably in the range of 10 $cm^3/m^2 \cdot day \cdot atm$ to 100 $cm^3/m^2 \cdot day \cdot atm$, more preferably from 60 $cm^3/m^2 \cdot day \cdot atm$ to 80 $cm^3/m^2 \cdot day \cdot atm$, and particularly from 40 $cm^3/m^2 \cdot day \cdot atm$ to 60 $cm^3/m^2 \cdot day \cdot atm$.

If the permeability thereof is less than 10, the gas remains in the bag at a high concentration in some cases. If the permeability thereof exceeds 100, the mesh the bag becomes coarse, and thus the protective performance can not be secured in some cases. In contrast, if the permeability thereof is in a specifically preferable range, filling of the ethylene gas is also advantageously prevented while securing the protective performance.

Meanwhile, the permeability of the protective bag to ethylene gas can be determined through the use of a gas permeability tester (trade name GTR-11A/31A, manufactured by GTR TEC CORPORATION) in accordance with the following procedure.

A nonwoven fabric as the base fabric the same as the fibers of protective bag is set in the tester, and there are determined the variations of ethylene gas concentration before and after passing a reference gas containing a certain concentration of ethylene gas through the nonwoven fabric, thereby being able to calculate the permeability.

<<Ethylene Gas Adsorption and Decomposition Performance of the Protective Bag>>

The ethylene gas adsorption and decomposition performance of the protective bag has no specific limitation, and can be adequately selected depending on the purpose. The ethylene gas adsorption and decomposition performance thereof is, however, preferably in the range of 100 ppm/h to 10,000 ppm/h, more preferably from 500 ppm/h to 1,000 ppm/h, and particularly from 800 ppm/h to 1,000 ppm/h.

If the ethylene gas adsorption and decomposition performance is less than 100 ppm/h, the increase in the concentration of ethylene gas in the protective bag cannot be suppressed in some cases. If the ethylene gas adsorption and so decomposition performance thereof exceeds 10,000 ppm/h, clogging of the mesh of the fabric deteriorates the gas permeability in some cases. In contrast, if the ethylene gas adsorption and decomposition performance thereof is in a specifically preferable range, the high adsorption and decomposition performance can be advantageously attained while securing the gas permeability.

Meanwhile, the ethylene gas adsorption and decomposition performance of the protective bag can be determined through the use of a gas chromatograph (trade name GC390B, manufactured by GL SCIENCES INC.) in accordance with the following procedure.

A protective bag fabric cut to a specified size (5 cm×5 cm) was put in a 0.5 L glass container, and the internal atmosphere of the glass container was substituted with a mixed gas of nitrogen and oxygen. Then, ethylene gas at a specific concentration was introduced into the glass container. After that, while irradiating the amounts of the container with light, the carbon dioxide concentration and the ethylene gas concentration in the container were determined by gas chromatography, and the efficiency of adsorption and decomposition were calculated.

<<Storage Container Capable of Holding the Protective Bags Containing Agricultural Products>>

The storage container is formed by at least a partition, a light irradiation unit, and an agitation unit. The storage container further has other members such as a power source and a unit for detecting ethylene gas as necessary.

—Partition—

The partition has no specific limitation as long as the partition separates the space in the storage container into smaller areas, and can be adequately selected depending on the purpose. However, the partition is preferably the one having a plurality of through-holes for allowing light and gas to pass there through (such as meshed type), from the viewpoint of preventing the placing surface of the protective bag from rotting, and of uniformizing the gas concentration in the storage container.

—Light Irradiation Unit—

The light irradiation unit has no specific limitation as long as the unit has a function of irradiating the protective bags containing the agricultural products with light, and can be adequately selected depending on the purpose. For example, the light irradiation unit includes an irradiating part in which a light-emitting diode (LED) is combined with an ultraviolet light lamp (UV lamp).

—Light-Emitting Diode (LED)—

The light-emitting diode (LED) has no specific limitation, and can be adequately selected depending on the purpose. For example, the LED includes BLUE LED 470 nm (manufactured by TOKYO RIKAKI CO., LTD.), RED LED 660 nm (manufactured by TOKYO RIKAKI CO., LTD.), and the like.

—Ultraviolet Light Lamp (UV Lamp)—

The ultraviolet light lamp (UV lamp) has no specific limitation, and can be adequately selected depending on the purpose. For example, the UV lamp includes BLACKLIGHT 10W FL10BL-B (manufactured by PANASONIC CORPORATION, and the like.

—Agitation Unit—

The agitation unit has no specific limitation as long as the unit has a function of agitating the gas in the storage container, and can be adequately selected depending on the purpose. An example of the agitation unit includes a fan.

—Power Source—

The power source has no specific limitation as long as the power source can supply power, and can be adequately selected depending on the purpose.

—Ethylene Gas-Concentration Detecting Unit—

The ethylene gas-concentration detecting unit has no specific limitation as long as the unit has a function of detecting the ethylene gas concentration, and can be adequately selected depending on the purpose. For example, the unit therefor includes semiconductor gas type apparatus (manufactured by FIGARO ENGINEERING INC.) For instance, the amount of light irradiation may be feedback-controlled based on the ethylene gas concentration detected by the ethylene gas-concentration detecting unit.

In FIG. 1, the inner space of a storage container 10 is separated into three stages by the respective partitions 11 made of stainless steel in a mesh shape. Protective bags 12 containing fruits placed on each stage are continuously irradiated with UV light by UV lamps 13 located at an upper portion of each space. In addition, the partition 11 made of stainless steel provides fans 14 for agitating the gas in the storage container in order to prevent irregular concentration of ethylene gas in the storage container 10. Furthermore, a power source 15 for supplying power is provided at a lower part of the storage container 10.

By harvesting the fruits (the agricultural products) in a state of being covered with the respective protective bags 12 in the storage container 10 having UV lamps 13, the protective bags 12 containing the fruits are stored in the storage container 10 having the light irradiation unit. Therefore, a placing face 12a side of the protective bag 12, which is difficult to be irradiated with light, is also efficiently irradiated with the light passing through the partition 11, because of the light reflection between the protective bags 12, and thus the maturing or rotting of fruits in the respective protective bags 12 can be suppressed.

The disclosed protective bag can solve the above existed problems, and can achieve the above object, thereby being capable of protecting an agricultural product such as fruit from insects and birds, suppressing maturing of the agricultural product by decomposing the ethylene gas generated from the agricultural product through the use of a photocatalyst, and suppressing the rotting of a harvested agricultural product during storage.

EXAMPLES

The present invention will be described more specifically through examples hereinafter. The present invention is, however, not limited to these examples.

Example 1

Supporting the Photocatalytic Titanium Apatite; with Photoreflecting Material Coating; Protective Bag in a Spherical Shape; Protective Bag Structure Free from Concave Parts on the Surface; and Protective Bag Fabricated by Nonwoven Fabric <Fabrication and Evaluation of Protective Bag>

There was prepared an air-permeable bag in a spherical shape having a diameter of 300 mm, made of nonwoven fabric (material: pulp, PE, etc.) (trade name FRUIT BAG, manufactured by SATOH SEITAI CORPORATION). The air-permeable bag was immersed in a photocatalytic titanium apatite aqueous dispersion, prepared as described below, for 10 seconds, followed by drying at 120° C. for 3 hours, and thus the photocatalytic titanium apatite was supported onto the air-permeable bag. Furthermore, a photoreflecting material aqueous dispersion, prepared as described below, was sprayed to the air-permeable bag, which was then dried at 120° C. for 3 hours and the photoreflecting material was coated on an outer surface of the air-permeable bag.

—Preparation of Photocatalytic Titanium Apatite Aqueous Dispersion—

The photocatalytic titanium apatite (apatite having titanium as the metal necessary to have the photocatalytic activity) was used as the photocatalytic material.

As the photocatalytic titanium apatite, the calcium titanium hydroxyapatite (TiHAP, manufactured by TAIHEI CHEMICAL INDUSTRIAL CO., LTD., PCAP-100, white powder having a volume average particle size ranging from 3 μm to 8 μm) illustrated in FIG. 2 was dispersed in water, and the photocatalytic titanium apatite aqueous dispersion having a solid content of 1% by mass was prepared.

Preparation of Photoreflecting Material Aqueous Dispersion

A dry-pulverized mica fine particles having a volume average particle size of 180 μm (trade name B-82, manufactured by YAMAGUCHI MICA CO., LTD.) as the photoreflecting material was dispersed in water and the photoreflecting material aqueous dispersion having a solid content of 1% by mass was prepared.

—Determination of Support Quantity of the Photocatalytic Titanium Apatite on the Protective Bag—

The support quantity of thus prepared photocatalytic titanium apatite on the protective bag was determined through the use of ICP-AES (trade name OPTIMA3000, manufactured by PERKIN ELMER, INC.) in accordance with the following procedure. The result is given in Table 1-2.

The photocatalytic titanium apatite supported on the protective bag was eluted by dilute nitric acid, and thus the components were quantitatively determined.

The presence of the photocatalytic titanium apatite on an outer surface of the protective bag was confirmed by the X-ray fluorescence analysis.

—Determination of Quantity of Photoreflecting Material Coating on the Protective Bag—

The quantity of thus prepared photoreflecting material coating on the protective bag was determined through the use of ICP-AES (trade name OPTIMA3000, manufactured by PERKIN ELMER, INC.) in accordance with the following procedure. The result is given in Table 1-2.

The photoreflecting material adhered to the protective bag was eluted by dilute nitric acid, the components were quantitatively determined, and thus calculated the quantity of the material was calculated.

The presence of the photoreflecting material on an outer surface of the protective bag was confirmed by the X-ray fluorescence analysis.

—Determination of Photoreflectance on the Protective Bag—

The photoreflectance of thus fabricated protective bag was determined through the use of UV-VIS (trade name V530, manufactured by JASCO CORPORATION) in accordance with the following procedure. The result is given in Table 1-2.

The fiber of protective bag was set in a spectroscope through the use of an attachment for determining thin-film reflectance, and then the reflectance is determined on a reference mirror.

—Determination of Permeability of the Protective Bag to Ethylene Gas—

The permeability of the fabricated protective bag to the ethylene gas was determined through the use of a gas permeability tester (trade name GTR-11A/31A, manufactured by GTR TEC CORPORATION) in accordance with the following procedure. The result is given in Table 1-2.

Meanwhile, a nonwoven fabric the same as that of protective bag was set in the tester, there was determined the variations of ethylene gas concentration before and after passing a reference gas containing a certain concentration of ethylene gas through the nonwoven fabric, and thus the permeability was calculated.

—Determination of Ethylene Gas Adsorption and Decomposition Performance of the Protective Bag—

The ethylene gas adsorption and decomposition performance of thus fabricated protective bag was determined through the use of a gas chromatograph (trade name GC390B, manufactured by GL SCIENCES INC.) in accordance with the following procedure. The result is given in Table 1-2.

A protective bag fabric cut to a specified size (5 cm×5 cm) was put in a 0.5 L glass container. The internal atmosphere of the glass container was substituted with a mixed gas of nitrogen and oxygen. Then, ethylene gas at a specific concentration was introduced into the glass container. After that, while irradiating the amounts of the container with light, the concentrations of carbon dioxide and ethylene gas in the container were determined by gas chromatography; and the efficiency of adsorption and decomposition was calculated.

<Cultivation Experiment>

(1) Outline of Cultivated Species: Crop Name Fuji (Apple)

The growth stage of the crop was the time of maturity.

(2) Section and Area: 1 Section, 8 Roots, with 3 Repeated Cultivations

Each of apple fruits at seed setting time was covered with the fabricated protective bag. Meanwhile, the fruits were irradiated with the solar ray for 30 days, or total 720 hours, while rainwater of 10 m$^3$ in total was given for 10 days.

The time when the color of the apple turned to red was defined as the time of fruition of the apple.

—Determination of Ethylene Gas Concentration—

Figure 3:
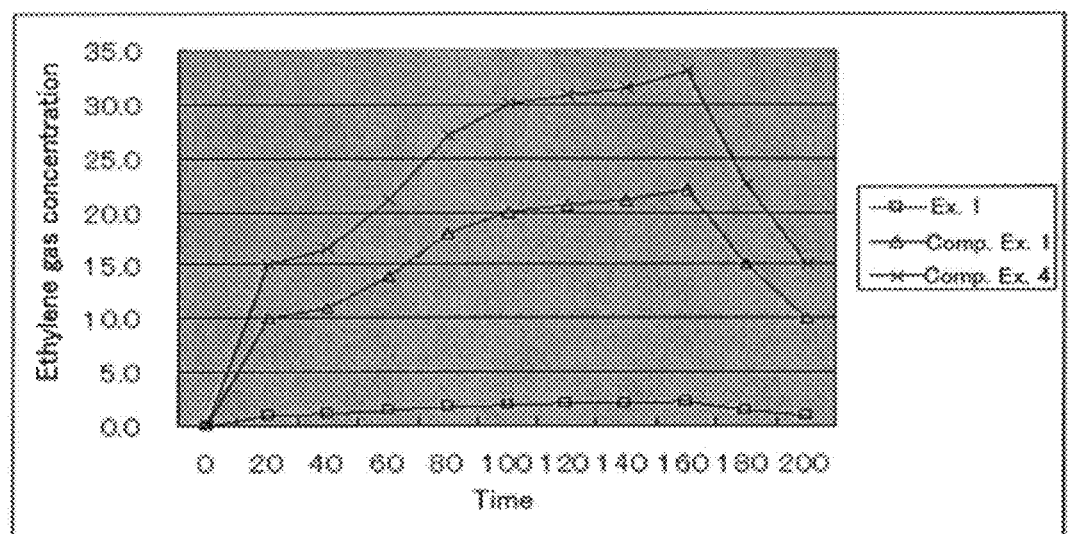
FIG. 3 is a graph illustrating the ethylene gas concentration ratio in cultivation experiments of Example 1, Comparative Example 1, and Comparative Example 4.

Among all the fruits, arbitrary 10 fruits were selected. The ethylene gas concentration (ppm) in the protective bags covering the respective selected fruits was determined through the use of a gas chromatograph (trade name GC390B, manufactured by GL SCIENCES INC.) at the seed setting time (at the time of applying the protective bag), after 20 hours from the seed setting time, 40 hours therefrom, 60 hours therefrom, 80 hours therefrom, 100 hours therefrom, 120 hours therefrom, 140 hours therefrom, 160 hours therefrom, 180 hours therefrom, and 200 hours therefrom. The result is given in Table 2-1, Table 2-2, and FIG. 3.

—Determination of Fruit Drop Rate—

Figure 4:
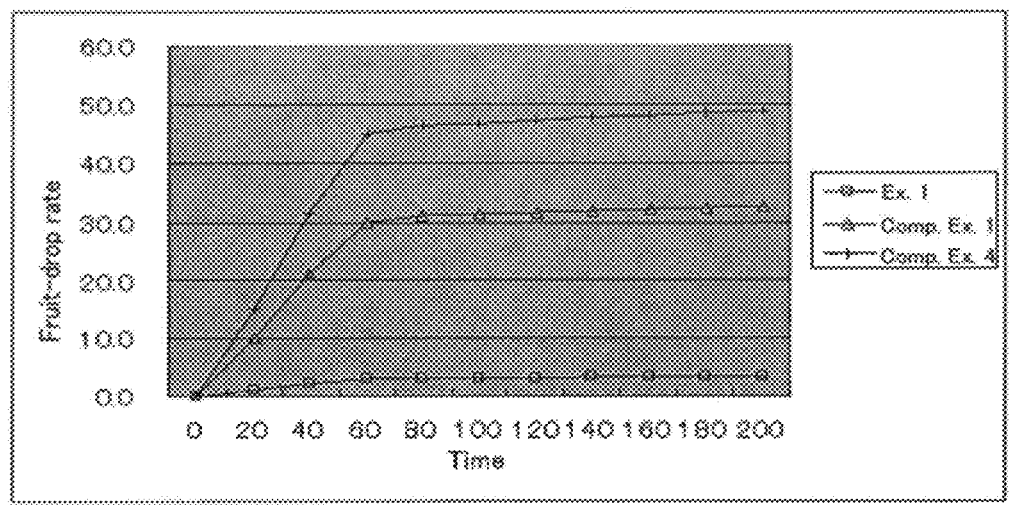
FIG. 4 is a graph illustrating the fruit-drop rate in cultivation experiments of Example 1, Comparative Example 1, and Comparative Example 4.

The percentage of the number of dropped fruits relative to the entire quantity of fruits was determined at the seed setting time, after 20 hours from the seed setting, 40 hours therefrom, 60 hours therefrom, 80 hours therefrom, 100 hours therefrom, 120 hours therefrom, 140 hours therefrom, 160 hours therefrom, 180 hours therefrom, and 200 hours therefrom. The result is given in Table 2-1, Table 2-2, and FIG. 4.

—Determination of Bird-Related Damage Rate—

Figure 5:
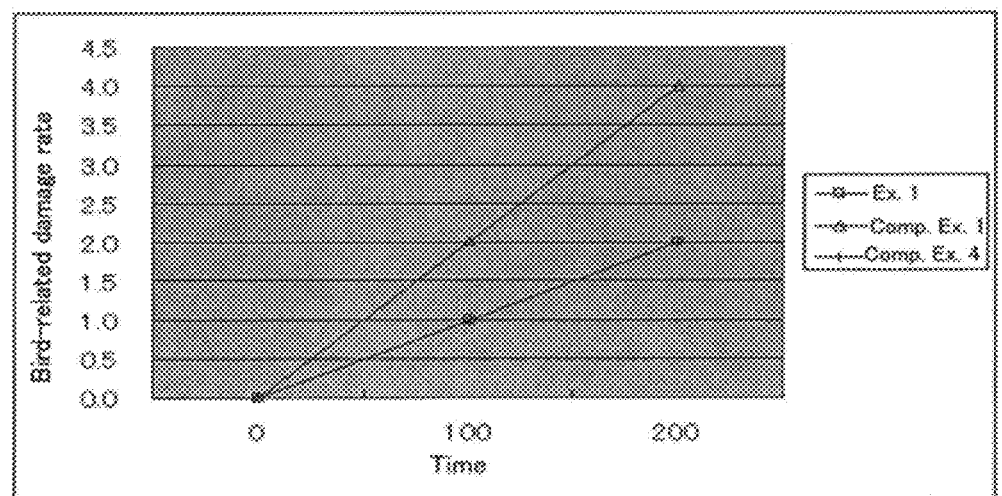
FIG. 5 is a graph illustrating the bird-related damage rate in cultivation experiments of Example 1, Comparative Example 1, and Comparative Example 4.

The percentage of the number of fruits damaged by birds relative to the entire quantity of fruits was determined at 100 hours from the seed setting time and at 200 hours therefrom. The result is given in Table 2-1, Table 2-2, and FIG. 5.

The identification of fruits damaged by birds or not damaged was performed by visual inspection to check the presence/absence of birds picking with their beaks.

—Determination of Fungus Generation Rate—

Figure 6:
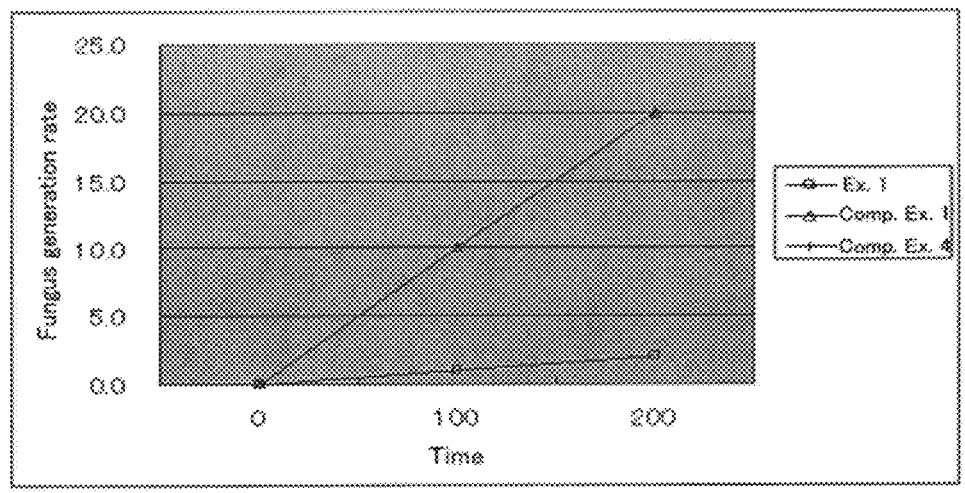
FIG. 6 is a graph illustrating the fungus generation rate in cultivation experiments of Example 1, Comparative Example 1, and Comparative Example 4.

The percentage of the number of protective bags containing moldy fruits relative to the entire quantity of protective bags containing fruits was determined at 100 hours from the seed setting time and 200 hours therefrom. The result is given in Table 2-1, Table 2-2, and FIG. 6.

Meanwhile, the generation of fungus on the protective bag was determined by visual inspection.

<Storage Experiment>

The fruits after 24 hours had passed from the seed setting time (at the time of applying the protective bag) were harvested in a state of being covered by the respective protective bags, and then the upper part of the respective protective bags was bound with string. The bound protective bags were stored in the storage container at intervals of about 50 mm therebetween.

The storage container is in size of 1.5 m×2.0 m×1.0 m, and separates the inner space into three stages with the respective partitions in a mesh shape, made of stainless steel. The protective bags containing fruits, placed on each stage, are continuously irradiated with ultraviolet light having wavelength ranging from 200 nm to 400 nm from the respective UV lamps of 10 mW/cm$^2$ (trade name FL10BL-B, manufactured by PANASONIC CORPORATION) being disposed at an upper part of each space. Furthermore, the partition made of stainless steel is provided with fans (trade name CF-40SS, manufactured by AINEX CO., LTD.) for agitating the gas in the storage container in order to prevent irregular concentration of ethylene gas in the storage container.

—Determination of Ethylene Gas Concentration—

Figure 7:
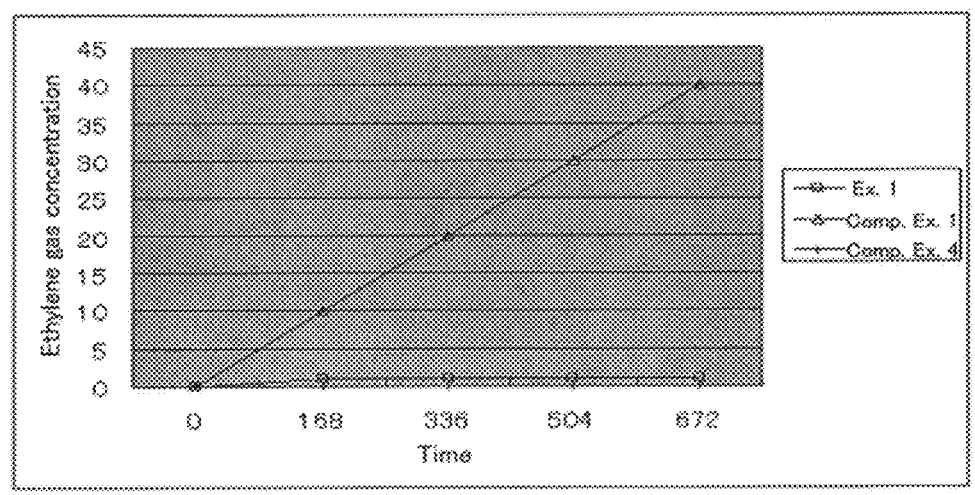
FIG. 7 is a graph illustrating the ethylene gas concentration rate in storage experiments of Example 1, Comparative Example 1, and Comparative Example 4.

The ethylene gas concentration (ppm) in the storage container was determined using a gas chromatograph (trade name GC390B, manufactured by GL SCIENCES INC.) at the time of starting the storage, after 168 hours from the start of storage, 336 hours therefrom, 504 hours therefrom, and 672 hours therefrom. The result is given in Table 3-1, Table 3-2, and FIG. 7.

—Determination of Rotting Rate—

Figure 8:
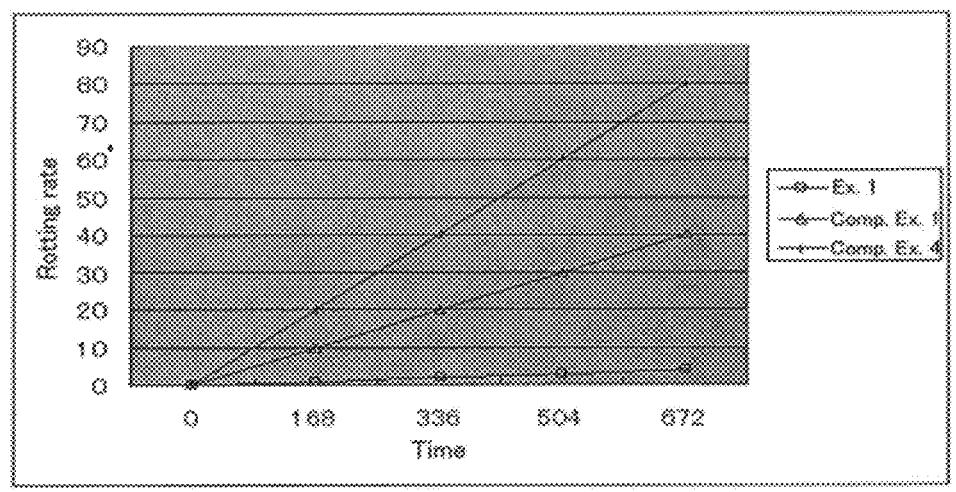
FIG. 8 is a graph illustrating the rotting rate in storage experiments of Example 1, Comparative Example 1, and Comparative Example 4.

The percentage of the number of fruits having rotted portion to the entire quantity of fruits was determined after 168 hours from the start of the storage, 336 hours therefrom, 504 hours therefrom, and 672 hours therefrom. The result is given in Table 3-1, Table 3-2, and FIG. 8.

The judgment of rotting state was given by visual identification of part-discoloration and by touch-feeling.

—Determination of Rotting Rate at Bottom Surface Side—

Figure 9:
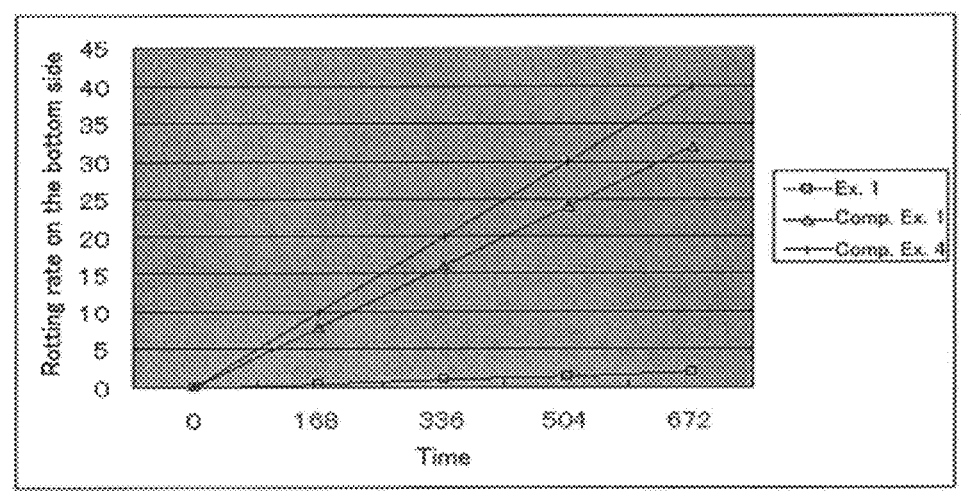
FIG. 9 is a graph illustrating the rotting rate at the bottom surface side in storage experiments of Example 1, Comparative Example 1, and Comparative Example 4.

In the storage container, the percentage of the number of fruits having rotted portion at further bottom surface side rather than the central portion of the fruit (the portion of further partition side rather than the central portion of the fruit) to the entire quantity of fruits was determined after 168 hours from the start of the storage, 336 hours therefrom, 504 hours therefrom, and 672 hours therefrom. The result is given in Table 3-1, Table 3-2, and FIG. 9.

—Determination of Heat-Retaining Effect—

Figure 10:
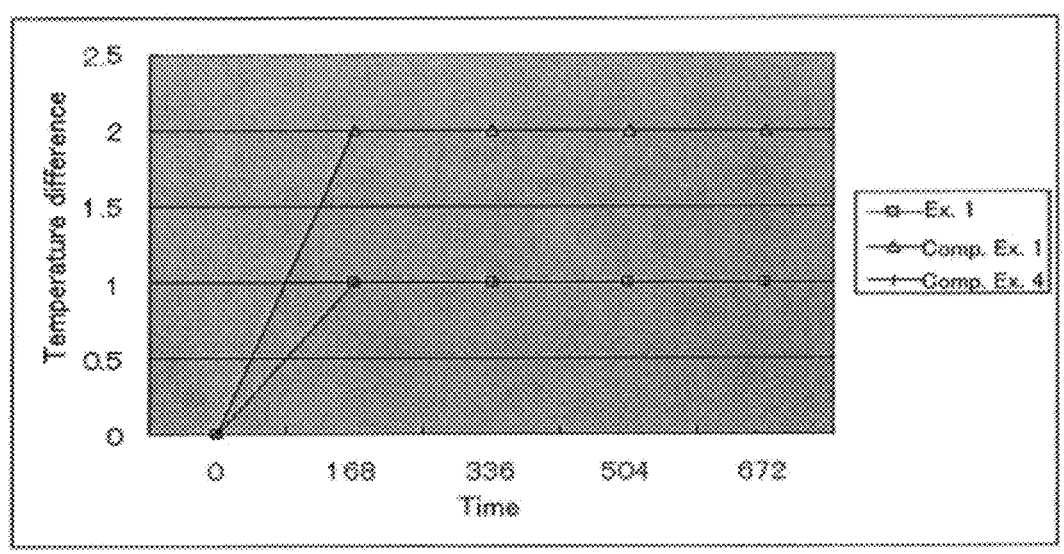
FIG. 10 is a graph illustrating the temperature difference in storage experiments of Example 1, Comparative Example 1, and Comparative Example 4.

Among all the fruits, arbitrary 10 fruits were selected. The temperature in the protective bags covering the respective selected fruits and the temperature inside the storage container were determined at the time of starting the storage, after 168 hours from the start of storing, 336 hours therefrom, 504 hours therefrom, and 672 hours therefrom. Then, the difference between the temperature in the protective bag and the temperature in the storage container was calculated. The result is given in Table 3-1, Table 3-2, and FIG. 10.

Example 2

Shape of the Protective Bag: Cube

Protective bags were fabricated in the same manner as in Example 1 except that the air-permeable bag used as the protective bag had a cubic shape with 100 mm in each side having the same surface area with that of the spherical air-permeable bag of Example 1. Thus fabricated protective bags were subjected to: evaluation (determination of support quantity of photocatalytic titanium apatite on the protective bag, determination of coating quantity of the photoreflecting material on the protective bag, determination of photoreflectance the protective bag, determination of permeability of the protective bag to ethylene gas, and determination of ethylene gas adsorption and decomposition performance of the protective bag); cultivation experiment (determination of ethylene gas concentration, determination of fruit drop rate, determination of bird-related damage rate, and determination of fungus generation rate); and storage experiment (determination of ethylene gas concentration, determination of rotting rate, determination of rotting rate at a bottom surface side, and determination of heat-retaining effect). The result is given in Table 1-1 to Table 3-2.

Example 3

Shape of the Protective Bag: with Bellows (Steps)

Protective bags were fabricated in the same manner as in Example 1 except that the air-permeable bag used as the protective bag had a spherical shape with an arrangement of 100 bellows (steps) in parallel, each having 10 mm in width and 0.5 mm in height. Thus fabricated protective bags were subjected to: evaluation (determination of support quantity of photocatalytic titanium apatite on the protective bag, determination of coating quantity of the photoreflecting material on the protective bag, determination of photoreflectance of the protective bag, determination of permeability of the protective bag to ethylene gas, and determination of ethylene gas adsorption and decomposition performance of the protective bag); cultivation experiment (determination of ethylene gas concentration, determination of fruit drop rate, determination of birds damage rate, and determination of fungus generation rate); and storage experiment (determination of ethylene gas concentration, determination of rotting rate, determination of rotting rate at a bottom surface side, and determination of heat-retaining effect). The result is given in Table 1-1 to Table 3-2.

Example 4

Material of the Protective Bag: Fiber

Protective bags were fabricated in the same manner as in Example 1 except that the air-permeable bag used as the protective bag was fabricated by a air-permeable bag made of fiber (material was pulp, PE, and the like). Thus fabricated protective bags were subjected to: evaluation (determination of support quantity of photocatalytic titanium apatite on the protective bag, determination of coating quantity of the photoreflecting material on the protective bag, determination of photoreflectance of the protective bag, determination of permeability of the protective bag to ethylene gas, and determination of ethylene gas adsorption and decomposition performance of the protective bag); cultivation experiment (determination of ethylene gas concentration, determination of fruit drop rate, determination of bird-related damage rate, and determination of fungus generation rate); and storage experiment (determination of ethylene gas concentration, determination of rotting rate, determination of rotting rate at a bottom surface side, and determination of heat-retaining effect). The result is given in Table 1-1 to Table 3-2.

Example 5

Structure of Protective Bag: with Concave Part on Outer Surface

Protective bags were fabricated in the same manner as in Example 1 except that the air-permeable bag used as the protective bag was emboss-worked using a needle point holder-shaped member having 10,000 of conical projections with 10 μm of bottom diameter and 10 μm of height on the base material at a density of 100 projections per $mm^2$, thus forming conical concave parts on the outer surface. Thus fabricated protective bags were subjected to: evaluation (determination of support quantity of photocatalytic titanium apatite on the protective bag, determination of coating quantity of the photoreflecting material on the protective bag, determination of photoreflectance of the protective bag, determination of permeability of the protective bag to ethylene gas, and determination of ethylene gas adsorption and decomposition performance of the protective bag); cultivation experiment (determination of ethylene gas concentration, determination of fruit drop rate, determination of bird-related damage rate, and determination of fungus generation rate); and storage experiment (determination of ethylene gas concentration, determination of rotting rate, determination of rotting rate at a bottom surface side, and determination of heat-retaining effect). The result is given in Table 1-1 to Table 3-2.

Example 6

Structure of Protective Bag: with Concave Part on Inner Surface

Protective bags were fabricated in the same manner as in Example 1 except that the air-permeable bag used as the protective bag was emboss-worked using a needle point holder-shaped member having 10,000 of conical projections with 10 μm of bottom diameter and 10 μm of height on the base material at a density of 100 projections per $mm^2$, thus forming conical concave parts on the inner surface. Thus fabricated protective bags were subjected to: evaluation (determination of support quantity of photocatalytic titanium apatite on the protective bag, determination of coating quantity of the photoreflecting material on the protective bag, determination of photoreflectance of the protective bag, determination of permeability of the protective bag to ethylene gas, and determination of ethylene gas adsorption and decomposition performance of the protective bag); cultivation experiment (determination of ethylene gas concentration, determination of fruit drop rate, determination of bird-related damage rate, and determination of fungus generation rate); and storage experiment (determination of ethylene gas concentration, determination of rotting rate, determination of rotting rate at a bottom surface side, and determination of heat-retaining effect). The result is given in Table 1-1 to Table 3-2.

Example 7

Another Example of the Photoreflecting Material

Protective bags were fabricated in the same manner as in Example 1 except that the photoreflecting material aqueous dispersion was produced using a photoreflecting material containing dry-pulverized mica fine particles having a volume average particle size of 10 μm (trade name SJ-010, manufactured by YAMAGUCHI MICA CO., LTD.) Thus fabricated protective bags were subjected to: evaluation (determination of support quantity of photocatalytic titanium apatite on the protective bag, determination of coating quantity of the photoreflecting material on the protective bag, determination of photoreflectance of the protective bag, determination of permeability of the protective bag to ethylene gas, and determination of ethylene gas adsorption and decomposition performance of the protective bag); cultivation experiment (determination of ethylene gas concentration, determination of fruit drop rate, determination of bird-related damage rate, and determination of fungus generation rate); and storage experiment (determination of ethylene gas concentration, determination of rotting rate, determination of rotting rate at a bottom surface side, and determination of heat-retaining effect). The result is given in Table 1-1 to Table 3-2.

Example 8

Photoreflecting Material Containing Two Groups of Particles Having a Large and Small Volume Average Particle Size, Respectively Protective bags were fabricated in the same manner as in Example 1 except that there was produced the photoreflecting material aqueous dispersion using a photoreflecting material containing two groups of particles having large and small size, respectively: a dry-pulverized mica fine particles having a volume average particle size of 180 μm (trade name B-82, manufactured by YAMAGUCHI MICA CO., LTD.); and a dry-pulverized mica fine particles having a volume average particle size of 5 μm (trade name SJ-005, manufactured by YAMAGUCHI MICA CO., LTD.). Thus fabricated protective bags were subjected to: evaluation (determination of support quantity of photocatalytic titanium apatite on the protective bag, determination of coating quantity of the photoreflecting material on the protective bag, determination of photoreflectance of the protective bag, determination of permeability of the protective bag to ethylene gas, and determination of ethylene gas adsorption and decomposition performance of the protective bag); cultivation experiment (determination of ethylene gas concentration, determination of fruit drop rate, determination of bird-related damage rate, and determination of fungus generation rate); and storage experiment (determination of ethylene gas concentration, determination of rotting rate, determination of rotting rate at a bottom surface side, and determination of heat-retaining effect). The result is given in Table 1-1 to Table 3-2.

Example 9

Mass Ratio of the Photoreflecting Material to the Photocatalytic Material

Protective bags were fabricated in the same manner as in Example 1 except that there was produced a photocatalytic titanium apatite aqueous dispersion having a solid content of 0.67% by mass, and there was produced a photoreflecting material aqueous dispersion having a solid content of 1.33% by mass. Thus fabricated protective bags were subjected to: evaluation (determination of support quantity of photocatalytic titanium apatite on the protective bag, determination of coating quantity of the photoreflecting material on the protective bag, determination of photoreflectance of the protective bag, determination of permeability of the protective bag to ethylene gas, and determination of ethylene gas adsorption and decomposition performance of the protective bag); cultivation experiment (determination of ethylene gas concentration, determination of fruit drop rate, determination of bird-related damage rate, and determination of fungus generation rate); and storage experiment (determination of ethylene gas concentration, determination of rotting rate, determination of rotting rate at a bottom surface side, and determination of heat-retaining effect). The result is given in Table 1-1 to Table 3-2.

Example 10

Mass Ratio of the Photoreflecting Material to the Photocatalytic Material

Protective bags were fabricated in the same manner as in Example 1 except that there was produced a photocatalytic titanium apatite aqueous dispersion having a solid content of 1.20% by mass, and there was produced a photoreflecting material aqueous dispersion having a solid content of 0.80% by mass. Thus fabricated protective bags were subjected to: evaluation (determination of support quantity of photocatalytic titanium apatite on the protective bag, determination of coating quantity of the photoreflecting material on the protective bag, determination of photoreflectance of the protective bag, determination of permeability of the protective bag to ethylene gas, and determination of ethylene gas adsorption and decomposition performance of the protective bag); cultivation experiment (determination of ethylene gas concentration, determination of fruit drop rate, determination of bird-related damage rate, and determination of fungus generation rate); and storage experiment (determination of ethylene gas concentration, determination of rotting rate, determination of rotting rate at a bottom surface side, and determination of heat-retaining effect). The result is given in Table 1-1 to Table 3-2.

Example 11

Mass Ratio of the Photoreflecting Material to the Photocatalytic Material

Protective bags were fabricated in the same manner as in Example 1 except that there was produced a photocatalytic titanium apatite aqueous dispersion having a solid content of 1.33% by mass, and there was produced a photoreflecting material aqueous dispersion having a solid content of 0.67% by mass. Thus fabricated protective bags were subjected to: evaluation (determination of support quantity of photocatalytic titanium apatite on the protective bag, determination of coating quantity of the photoreflecting material on the protective bag, determination of photoreflectance of the protective bag, determination of permeability of the protective bag to ethylene gas, and determination of ethylene gas adsorption and decomposition performance of the protective bag); cultivation experiment (determination of ethylene gas concentration, determination of fruit drop rate, determination of bird-related damage rate, and determination of fungus generation rate); and storage experiment (determination of ethylene gas concentration, determination of rotting rate, determination of rotting rate at a bottom surface side, and determination of heat-retaining effect). The result is given in Table 1-1 to Table 3-2.

Example 12

Large Quantity of Photocatalytic Material at the Portion of a Bottom Surface Side Protective bags were fabricated in the same manner as in Example 1, except that the protective bag was fabricated so that the quantity of photocatalytic material at the portion of further bottom surface side rather than the central portion of the protective bag (the portion of further partition side rather than the central portion of the protective bag) becomes double the quantity of photocatalytic, material at other portions. Thus fabricated protective bags were subjected to: evaluation (determination of support quantity of photocatalytic titanium apatite on the protective bag, determination of coating quantity of the photoreflecting material on the protective bag, determination of photoreflectance of the protective bag, determination of permeability of the protective bag to ethylene gas, and determination of ethylene gas adsorption and decomposition performance of the protective bag); cultivation experiment (determination of ethylene gas concentration, determination of fruit drop rate, determination of bird-related damage rate, and determination of fungus generation rate); and storage experiment (determination of ethylene gas concentration, determination of rotting rate, determination of rotting rate at a bottom surface side, and determination of heat-retaining effect). The result is given in Table 1-1 to Table 3-2.

Example 13

Photoreflecting Material: Colored Fiber

Protective bags were fabricated in the same manner as in Example 1 except that the protective bag was fabricated without coating the photoreflecting material on the air-permeable bag and with woven colored fiber (material: PE, PC) thereinto as the photoreflecting material. Thus fabricated protective bags were subjected to: evaluation (determination of support quantity of photocatalytic titanium apatite on the protective bag, determination of coating quantity of the photoreflecting material on the protective bag, determination of photoreflectance of the protective bag, determination of permeability of the protective bag to ethylene gas, and determination of ethylene gas adsorption and decomposition performance of the protective bag); cultivation experiment (determination of ethylene gas concentration, determination of fruit drop rate, determination of bird-related damage rate, and determination of fungus generation rate); and storage experiment (determination of ethylene gas concentration, determination of rotting rate, determination of rotting rate at a bottom surface side, and determination of heat-retaining effect). The result is given in Table 1-1 to Table 3-2.

Example 14

Repeated Test

The protective bags fabricated and subjected to evaluation, cultivation experiment, and storage experiment in Example 1 were again subjected to the cultivation experiment (determination of ethylene gas concentration, determination of fruit drop rate, determination of bird-related damage rate, and determination of fungus generation rate) and the storage experiment (determination of ethylene gas concentration, determination of rotting rate, determination of rotting rate at a bottom surface side, and determination of heat-retaining effect) similar to those of Example 1. The result is given in Table 1-1 to Table 3-2.

Comparative Example 1

Without Supporting the Photocatalytic Titanium Apatite, without Coating of the Photoreflecting Material Protective bags were fabricated in the same manner as in Example 1 except that the air-permeable bag (trade name FRUIT BAG, manufactured by SATOH SEITAI CORPORATION) was used as the protective bag. Thus fabricated protective bags were subjected to: evaluation (determination of support quantity of photocatalytic titanium apatite on the protective bag, determination of coating quantity of the photoreflecting material on the protective bag, determination of photoreflectance of the protective bag, determination of permeability of the protective bag to ethylene gas, and determination of ethylene gas adsorption and decomposition performance of the protective bag); cultivation experiment (determination of ethylene gas concentration, determination of fruit drop rate, determination of bird-related damage rate, and determination of fungus generation rate); and storage experiment (determination of ethylene gas concentration, determination of rotting rate, determination of rotting rate at a bottom surface side, and determination of heat-retaining effect). The result is given in Table 1-1 to Table 3-2, and FIGS. 3 to 10.

Comparative Example 2

Without Supporting the Photocatalytic Titanium Apatite

Protective bags were fabricated in the same manner as in Example 1 except that the protective bags were fabricated without supporting the photocatalytic material thereon, without performing immersion of the air-permeable bags in the photo catalytic titanium apatite aqueous dispersion, and without drying the air-permeable bags after immersion. Thus fabricated protective bags were subjected to: evaluation (determination of support quantity of photocatalytic titanium apatite on the protective bag, determination of coating quantity of the photoreflecting material on the protective bag, determination of photoreflectance of the protective bag, determination of permeability of the protective bag to ethylene gas, and determination of ethylene gas adsorption and decomposition performance of the protective bag); cultivation experiment (determination of ethylene gas concentration, determination of fruit drop rate, determination of bird-related damage rate, and determination of fungus generation rate); and storage experiment (determination of ethylene gas concentration, determination of rotting rate, determination of rotting rate at a bottom surface side, and determination of heat-retaining effect). The result is shown in Table 1-1 to Table 3-2.

Comparative Example 3

Without Coating of the Photoreflecting Material

Protective bags were fabricated in the same manner as in Example 1 except that the protective bag was fabricated without coating of the photoreflecting material thereon, and without spraying the photoreflecting material aqueous dispersion to the air-permeable bag and without drying the air-permeable bag. Thus fabricated protective bags were subjected to: evaluation (determination of support quantity of photocatalytic titanium apatite on the protective bag, determination of coating quantity of the photoreflecting material on the protective bag, determination of photoreflectance of the protective bag, determination of permeability of the protective bag to ethylene gas, and determination of ethylene gas adsorption and decomposition performance of the protective bag); cultivation experiment (determination of ethylene gas concentration, determination of fruit drop rate, determination of bird-related damage rate, and determination of fungus generation rate); and storage experiment (determination of ethylene gas concentration, determination of rotting rate, determination of rotting rate at a bottom surface side, and determination of heat-retaining effect). The result is given in Table 1-1 to Table 3-2.

Comparative Example 4

Film

Protective bags were fabricated in the same manner as in Example 1 except that the protective bag was fabricated by using a bag made of a film (material: polyethylene) instead of the air-permeable bag made of nonwoven fabric (material: PC). Thus fabricated protective bags were subjected to: evaluation (determination of support quantity of photocatalytic titanium apatite on the protective bag, determination of coating quantity of the photoreflecting material on the protective bag, determination of photoreflectance of the protective bag, determination of permeability of the protective bag to ethylene gas, and determination of ethylene gas adsorption and decomposition performance of the protective bag); cultivation experiment (determination of ethylene gas concentration, determination of fruit drop rate, determination of bird-related damage rate, and determination of fungus generation rate); and storage experiment (determination of ethylene gas concentration, determination of rotting rate, determination of rotting rate at a bottom surface side, and determination of heat-retaining effect). The result is given in Table 1-1 to Table 3-2, and FIGS. 3 to 10.

TABLE 1-1

| | Material | Shape | Surface roughening | Photocatalyst | Photoreflecting material |
|---|---|---|---|---|---|
| Ex. 1 | Nonwoven fabric | Sphere | None | TiHAP | Dry-pulverized mica powder particles |
| Ex. 2 | Nonwoven fabric | Cube | None | TiHAP | Dry-pulverized mica powder particles |
| Ex. 3 | Nonwoven fabric | Sphere + Bellows (step) | None | TiHAP | Dry-pulverized mica powder particles |

TABLE 1-1-continued

|  | Material | Shape | Surface roughening | Photocatalyst | Photoreflecting material |
|---|---|---|---|---|---|
| Ex. 4 | Fiber | Sphere | None | TiHAP | Dry-pulverized mica powder particles |
| Ex. 5 | Nonwoven fabric | Sphere | Outer surface | TiHAP | Dry-pulverized mica powder particles |
| Ex. 6 | Nonwoven fabric | Sphere | Inner surface | TiHAP | Dry-pulverized mica powder particles |
| Ex. 7 | Nonwoven fabric | Sphere | None | TiHAP | Dry-pulverized mica powder particles |
| Ex. 8 | Nonwoven fabric | Sphere | None | TiHAP | Two groups of dry-pulverized mica powder particles (different particle size) |
| Ex. 9 | Nonwoven fabric | Sphere | None | TiHAP | Dry-pulverized mica powder particles |
| Ex. 10 | Nonwoven fabric | Sphere | None | TiHAP | Dry-pulverized mica powder particles |
| Ex. 11 | Nonwoven fabric | Sphere | None | TiHAP | Dry-pulverized mica powder particles |
| Ex. 12 | Nonwoven fabric | Sphere | None | TiHAP | Dry-pulverized mica powder particles |
| Ex. 13 | Fibers | Sphere | None | TiHAP | Colored Fiber |
| Ex. 14 | Nonwoven fabric | Sphere | None | TiHAP | Dry-pulverized mica powder particles |
| Comp. Ex. 1 | Nonwoven fabric | Sphere | None | None | None |
| Comp. Ex. 2 | Nonwoven fabric | Sphere | None | None | Dry-pulverized mica powder particles |
| Comp. Ex. 3 | Nonwoven fabric | Sphere | None | TiHAP | None |
| Comp. Ex. 4 | Film | Sphere | None | TiHAP | Dry-pulverized mica powder particles |

TABLE 1-2

|  | Support quantity of photocatalyst | Coating of photo-reflecting material | Mass ratio (Photocatalyst/Photo-reflecting material) | Photo-reflectance | Ethylene gas permeability | Ethylene gas adsorption and decomposition performance |
|---|---|---|---|---|---|---|
| Ex. 1 | 1.00 | 1.00 | 1.00 | 1.00 | 1.00 | 1.00 |
| Ex. 2 | 1.00 | 1.00 | 1.00 | 0.90 | 1.00 | 1.00 |
| Ex. 3 | 1.20 | 1.20 | 1.00 | 1.05 | 1.00 | 1.20 |
| Ex. 4 | 0.80 | 0.80 | 1.00 | 0.95 | 1.10 | 0.80 |
| Ex. 5 | 1.30 | 1.30 | 1.00 | 1.10 | 1.00 | 1.30 |
| Ex. 6 | 0.80 | 0.80 | 1.00 | 1.05 | 1.20 | 0.80 |
| Ex. 7 | 1.00 | 1.00 | 1.00 | 1.10 | 1.00 | 1.00 |
| Ex. 8 | 1.00 | 1.00 | 1.00 | 1.30 | 1.00 | 1.00 |
| Ex. 9 | 0.67 | 1.33 | 0.50 | 1.10 | 1.00 | 0.67 |
| Ex. 10 | 1.20 | 0.80 | 1.50 | 0.95 | 1.00 | 1.20 |
| Ex. 11 | 1.33 | 0.67 | 2.00 | 0.90 | 1.00 | 1.33 |
| Ex. 12 | 1.00 | 1.00 | 1.00 | 1.00 | 1.00 | 1.00 |
| Ex. 13 | 0.80 |  |  | 1.00 | 1.10 | 0.80 |
| Ex. 14 | 1.00 | 1.00 | 1.00 | 1.00 | 1.00 | 1.00 |
| Comp. Ex. 1 | 0.00 | 0.00 |  | 0.50 | 1.00 | 0.00 |
| Comp. Ex. 2 | 0.00 | 1.00 |  | 1.00 | 1.00 | 0.00 |
| Comp. Ex. 3 | 1.00 | 0.00 |  | 0.50 | 1.00 | 1.00 |
| Comp. Ex. 4 | 1.00 | 1.00 | 1.00 | 1.00 | 0.00 | 1.00 |

In Table 1-2, each value of "support quantity of photocatalyst", "coating quantity of photoreflecting material", "photoreflectance", "ethylene gas permeability", and "ethylene gas adsorption and decomposition performance" is the value when each value of "support quantity of photocatalyst", "coating quantity of photoreflecting material", "photoreflectance", "ethylene gas permeability", and "ethylene gas adsorption and decomposition performance" in Example 1 is set to 1.

TABLE 2-1

|  | At seed setting Ethylene gas conc. | 20 hours later | | 40 hours later | | 60 hours later | | 80 hours later | | 100 hours later | | | |
|---|---|---|---|---|---|---|---|---|---|---|---|---|---|
|  |  | Ethylene gas conc. | Fruit drop rate | Ethylene gas conc. | Fruit drop rate | Ethylene gas conc. | Fruit drop rate | Ethylene gas conc. | Fruit drop rate | Ethylene gas conc. | Fruit drop rate | Bird-related damage rate | Fungus generation rate |
| Ex. 1 | 0.0 | 1.0 | 1.0 | 1.1 | 2.1 | 1.4 | 3.0 | 1.8 | 3.1 | 2.0 | 3.1 | 1.0 | 1.0 |
| Ex. 2 | 0.0 | 1.0 | 1.0 | 1.1 | 2.1 | 1.4 | 3.0 | 1.8 | 3.1 | 2.0 | 3.1 | 1.1 | 1.0 |
| Ex. 3 | 0.0 | 0.8 | 0.8 | 0.9 | 1.7 | 1.1 | 2.4 | 1.4 | 2.5 | 1.6 | 2.5 | 0.9 | 0.8 |
| Ex. 4 | 0.0 | 1.2 | 1.2 | 1.3 | 2.5 | 1.7 | 3.6 | 2.2 | 3.7 | 2.4 | 3.7 | 1.1 | 1.1 |
| Ex. 5 | 0.0 | 0.7 | 0.7 | 0.7 | 1.4 | 0.9 | 2.0 | 1.2 | 2.0 | 1.3 | 2.0 | 0.9 | 1.0 |
| Ex. 6 | 0.0 | 1.2 | 1.2 | 1.3 | 2.5 | 1.7 | 3.6 | 2.2 | 3.7 | 2.4 | 3.7 | 0.9 | 0.8 |
| Ex. 7 | 0.0 | 1.0 | 1.0 | 1.1 | 2.1 | 1.4 | 3.0 | 1.8 | 3.1 | 2.0 | 3.1 | 0.9 | 1.0 |
| Ex. 8 | 0.0 | 1.0 | 1.0 | 1.1 | 2.1 | 1.4 | 3.0 | 1.8 | 3.1 | 2.0 | 3.1 | 0.8 | 1.0 |
| Ex. 9 | 0.0 | 1.4 | 1.4 | 1.5 | 2.8 | 1.9 | 4.1 | 2.4 | 4.2 | 2.7 | 4.2 | 0.9 | 1.4 |
| Ex. 10 | 0.0 | 0.8 | 0.8 | 0.9 | 1.7 | 1.1 | 2.4 | 1.4 | 2.5 | 1.6 | 2.5 | 1.1 | 0.8 |
| Ex. 11 | 0.0 | 0.7 | 0.7 | 0.7 | 1.4 | 0.9 | 2.0 | 1.2 | 2.0 | 1.3 | 2.0 | 1.1 | 0.7 |
| Ex. 12 | 0.0 | 1.0 | 1.0 | 1.1 | 2.1 | 1.4 | 3.0 | 1.8 | 3.1 | 2.0 | 3.1 | 1.0 | 1.0 |
| Ex. 13 | 0.0 | 1.2 | 1.2 | 1.3 | 2.5 | 1.7 | 3.6 | 2.2 | 3.7 | 2.4 | 3.7 | 1.1 | 1.1 |
| Ex. 14 | 0.0 | 1.0 | 1.0 | 1.1 | 2.1 | 1.4 | 3.0 | 1.8 | 3.1 | 2.0 | 3.1 | 1.0 | 1.0 |
| Comp. Ex. 1 | 0.0 | 10.0 | 10.0 | 11.0 | 21.0 | 14.0 | 30.0 | 18.0 | 30.9 | 20.0 | 31.2 | 2.0 | 10.0 |
| Comp. Ex. 2 | 0.0 | 10.0 | 10.0 | 11.0 | 21.0 | 14.0 | 30.0 | 18.0 | 30.9 | 20.0 | 31.2 | 1.0 | 10.0 |
| Comp. Ex. 3 | 0.0 | 1.0 | 1.0 | 1.1 | 2.1 | 1.4 | 3.0 | 1.8 | 3.1 | 2.0 | 3.1 | 2.0 | 1.0 |
| Comp. Ex. 4 | 0.0 | 15.0 | 15.0 | 16.5 | 31.5 | 21.0 | 45.0 | 27.0 | 46.4 | 30.0 | 46.8 | 1.0 | 10.0 | in Table 2-1, each value of "ethylene gas concentration", "fruit drop rate", "bird-related damage rate", and "fungus generation rate" is the value when the ethylene gas concentration after 20 hours in Example 1 is set to 1, the fruit drop rate after 20 hours in Example 1 is set to 1, the bird-related damage rate after 100 hours in Example 1 is set to 1, and the fungus generation rate after 0.100 hours in Example 1 is set to 1, In Table 2-2, each value of "ethylene gas concentration", "fruit drop rate", "birds-related damage rate", and "fungus generation rate" is the value when the ethylene gas concentration, after 20 hours in Example 1 is set to 1, the fruit drop rate after 20 hours in Example 1 is selected to 1, the birds-related damage rate after 100 hours in Example 1 is set to 1, and the fungus generation rate after 100 hours in Example 1 is set to 1.

TABLE 2-2

|  | 120 hours later | | 140 hours later | | 160 hours later | | 180 hours later | | 200 hours later | | | |
|---|---|---|---|---|---|---|---|---|---|---|---|---|
|  | Ethylene gas concentration | Fruit drop rate | Ethylene gas concentration | Fruit drop rate | Ethylene gas concentration | Fruit drop rate | Ethylene gas concentration | Fruit drop rate | Ethylene gas concentration | Fruit drop rate | Bird-related damage rate | Fungus generation rate |
| Ex. 1 | 2.1 | 3.2 | 2.1 | 3.2 | 2.2 | 3.2 | 1.5 | 3.2 | 1.0 | 3.3 | 2.0 | 2.0 |
| Ex. 2 | 2.1 | 3.2 | 2.1 | 3.2 | 2.2 | 3.2 | 1.5 | 3.2 | 1.0 | 3.3 | 2.2 | 2.0 |
| Ex. 3 | 1.6 | 2.5 | 1.7 | 2.5 | 1.8 | 2.6 | 1.2 | 2.6 | 0.8 | 2.6 | 1.8 | 1.6 |
| Ex. 4 | 2.5 | 3.8 | 2.5 | 3.8 | 2.6 | 3.9 | 1.8 | 3.9 | 1.2 | 3.9 | 2.1 | 2.2 |
| Ex. 5 | 1.3 | 2.1 | 1.4 | 2.1 | 1.4 | 2.1 | 1.0 | 2.2 | 0.7 | 2.2 | 1.8 | 2.0 |
| Ex. 6 | 2.5 | 3.8 | 2.5 | 3.8 | 2.6 | 3.9 | 1.8 | 3.9 | 1.2 | 3.9 | 1.9 | 1.6 |
| Ex. 7 | 2.1 | 3.2 | 2.1 | 3.2 | 2.2 | 3.2 | 1.5 | 3.2 | 1.0 | 3.3 | 1.8 | 2.0 |
| Ex. 8 | 2.1 | 3.2 | 2.1 | 3.2 | 2.2 | 3.2 | 1.5 | 3.2 | 1.0 | 3.3 | 1.5 | 2.0 |
| Ex. 9 | 2.8 | 4.3 | 2.8 | 4.3 | 3.0 | 4.4 | 2.0 | 4.4 | 1.4 | 4.5 | 1.8 | 2.7 |
| Ex. 10 | 1.6 | 2.5 | 1.7 | 2.5 | 1.8 | 2.6 | 1.2 | 2.6 | 0.8 | 2.6 | 2.1 | 1.6 |
| Ex. 11 | 1.3 | 2.1 | 1.4 | 2.1 | 1.4 | 2.1 | 1.0 | 2.2 | 0.7 | 2.2 | 2.2 | 1.3 |
| Ex. 12 | 2.1 | 3.2 | 2.1 | 3.2 | 2.2 | 3.2 | 1.5 | 3.2 | 1.0 | 3.3 | 2.0 | 2.0 |
| Ex. 13 | 2.5 | 3.8 | 2.5 | 3.8 | 2.6 | 3.9 | 1.8 | 3.9 | 1.2 | 3.9 | 2.1 | 2.2 |
| Ex. 14 | 2.1 | 3.2 | 2.1 | 3.2 | 2.2 | 3.2 | 1.5 | 3.2 | 1.0 | 3.3 | 2.0 | 2.0 |
| Comp. Ex. 1 | 20.5 | 31.5 | 21.0 | 31.8 | 22.0 | 32.1 | 15.0 | 32.4 | 10.0 | 32.7 | 4.0 | 20.0 |
| Comp. Ex. 2 | 20.5 | 31.5 | 21.0 | 31.8 | 22.0 | 32.1 | 15.0 | 32.4 | 10.0 | 32.7 | 2.0 | 20.0 |
| Comp. Ex. 3 | 2.1 | 3.2 | 2.1 | 3.2 | 2.2 | 3.2 | 1.5 | 3.2 | 1.0 | 3.3 | 4.0 | 2.0 |
| Comp. Ex. 4 | 30.8 | 47.3 | 31.5 | 47.7 | 33.0 | 48.2 | 22.5 | 48.6 | 15.0 | 49.1 | 2.0 | 20.0 |

TABLE 3-1

| | Initial stage of storage | | | 168 hours later | | | | 336 hours later | | | |
|---|---|---|---|---|---|---|---|---|---|---|---|
| | Ethylene gas concentration | Rotting rate | Rotting rate at bottom surface | Ethylene gas concentration | Rotting rate | Rotting rate at bottom surface | Temperature difference | Ethylene gas concentration | Rotting rate | Rotting rate at bottom surface | Temperature difference |
| Ex. 1 | 0 | 0 | 0 | 1.0 | 1.0 | 0.5 | 1.00 | 1.0 | 2.0 | 1.0 | 1.00 |
| Ex. 2 | 0 | 0 | 0 | 1.0 | 1.0 | 0.5 | 1.11 | 1.0 | 2.0 | 1.0 | 1.11 |
| Ex. 3 | 0 | 0 | 0 | 0.8 | 0.8 | 0.4 | 0.95 | 0.8 | 1.6 | 0.8 | 0.95 |
| Ex. 4 | 0 | 0 | 0 | 1.2 | 1.2 | 0.6 | 1.05 | 1.2 | 2.4 | 1.2 | 1.05 |
| Ex. 5 | 0 | 0 | 0 | 0.7 | 0.7 | 0.3 | 0.91 | 0.7 | 1.3 | 0.7 | 0.91 |
| Ex. 6 | 0 | 0 | 0 | 1.2 | 1.2 | 0.6 | 1.05 | 1.2 | 2.4 | 1.2 | 1.05 |
| Ex. 7 | 0 | 0 | 0 | 1.0 | 1.0 | 0.5 | 0.91 | 1.0 | 2.0 | 1.0 | 0.91 |
| Ex. 8 | 0 | 0 | 0 | 1.0 | 1.0 | 0.5 | 0.77 | 1.0 | 2.0 | 1.0 | 0.77 |
| Ex. 9 | 0 | 0 | 0 | 1.4 | 1.4 | 0.7 | 0.91 | 1.4 | 2.7 | 1.4 | 0.91 |
| Ex. 10 | 0 | 0 | 0 | 0.8 | 0.8 | 0.4 | 1.05 | 0.8 | 1.6 | 0.8 | 1.05 |
| Ex. 11 | 0 | 0 | 0 | 0.7 | 0.7 | 0.3 | 1.11 | 0.7 | 1.3 | 0.7 | 1.11 |
| Ex. 12 | 0 | 0 | 0 | 1.0 | 0.8 | 0.4 | 1.00 | 1.0 | 1.6 | 0.8 | 1.00 |
| Ex. 13 | 0 | 0 | 0 | 1.2 | 1.1 | 0.6 | 1.00 | 1.2 | 2.2 | 1.1 | 1.05 |
| Ex. 14 | 0 | 0 | 0 | 1.0 | 1.0 | 0.5 | 1.00 | 1.0 | 2.0 | 1.0 | 1.00 |
| Comp. Ex. 1 | 0 | 0 | 0 | 10.0 | 10.0 | 8.0 | 2.00 | 20.0 | 20.0 | 16.0 | 2.00 |
| Comp. Ex. 2 | 0 | 0 | 0 | 10.0 | 10.0 | 5.0 | 1.00 | 20.0 | 20.0 | 10.0 | 1.00 |
| Comp. Ex. 3 | 0 | 0 | 0 | 1.5 | 1.5 | 1.2 | 2.00 | 1.5 | 3.0 | 2.4 | 2.00 |
| Comp. Ex. 4 | 0 | 0 | 0 | 0.0 | 20.0 | 10.0 | 1.00 | 0.0 | 40.0 | 20.0 | 1.00 |

In Table 3-1, each value of "ethylene gas concentration", "rotting rate", "rotting rate at bottom surface", and "temperature difference" is the value when the ethylene gas concentration after 168 hours in Example 1 is set to 1, the rotting rate after 168 hours in Example 1 is set to 1, the temperature difference after 108 hours in Example 1 is set to 1.

TABLE 3-2

| | 504 hours later | | | | 672 hours later | | | |
|---|---|---|---|---|---|---|---|---|
| | Ethylene gas concentration | Rotting rate | Rotting rate at bottom surface | Temperature difference | Ethylene gas concentration | Rotting rate | Rotting rate at bottom surface | Temperature difference |
| Ex. 1 | 1.0 | 3.0 | 1.5 | 1.00 | 1.0 | 4.0 | 2.0 | 1.00 |
| Ex. 2 | 1.0 | 3.0 | 1.5 | 1.11 | 1.0 | 4.0 | 2.0 | 1.11 |
| Ex. 3 | 0.8 | 2.4 | 1.2 | 0.95 | 0.8 | 3.2 | 1.6 | 0.95 |
| Ex. 4 | 1.2 | 3.6 | 1.8 | 1.05 | 1.2 | 4.8 | 2.4 | 1.05 |
| Ex. 5 | 0.7 | 2.0 | 1.0 | 0.91 | 0.7 | 2.6 | 1.3 | 0.91 |
| Ex. 6 | 1.2 | 3.6 | 1.8 | 1.05 | 1.2 | 4.8 | 2.4 | 1.05 |
| Ex. 7 | 1.0 | 3.0 | 1.5 | 0.91 | 1.0 | 4.0 | 2.0 | 0.91 |
| Ex. 8 | 1.0 | 3.0 | 1.5 | 0.77 | 1.0 | 4.0 | 2.0 | 0.77 |
| Ex. 9 | 1.4 | 4.1 | 2.0 | 0.91 | 1.4 | 5.4 | 2.7 | 0.91 |
| Ex. 10 | 0.8 | 2.4 | 1.2 | 1.05 | 0.8 | 3.2 | 1.6 | 1.05 |
| Ex. 11 | 0.7 | 2.0 | 1.0 | 1.11 | 0.7 | 2.6 | 1.3 | 1.11 |
| Ex. 12 | 1.0 | 2.4 | 1.2 | 1.00 | 1.0 | 3.2 | 1.6 | 1.00 |
| Ex. 13 | 1.2 | 3.3 | 1.7 | 1.05 | 1.2 | 4.4 | 2.2 | 1.05 |
| Ex. 14 | 1.0 | 3.0 | 1.5 | 1.00 | 1.0 | 4.0 | 2.0 | 1.00 |
| Comp. Ex. 1 | 30.0 | 30.0 | 24.0 | 2.00 | 40.0 | 40.0 | 32.0 | 2.00 |
| Comp. Ex. 2 | 30.0 | 30.0 | 15.0 | 1.00 | 40.0 | 40.0 | 20.0 | 1.00 |
| Comp. Ex. 3 | 1.5 | 4.5 | 3.6 | 2.00 | 1.5 | 6.0 | 4.8 | 2.00 |
| Comp. Ex. 4 | 0.0 | 60.0 | 30.0 | 1.00 | 0.0 | 80.0 | 40.0 | 1.00 |

In Table 3-2, each value of "ethylene gas concentration", "rotting rate", "rotting rate at bottom surface", and "temperature difference" is the value when the ethylene gas concentration after 168 hours in Example 1 is set to 1, the rotting rate after 168 hours in Example 1 is set to 1, the temperature difference after 168 hours in Example 1 is set to 1.

The invention claimed is:

1. A protective bag, comprising:
   an air-permeable bag;
   a photoreflecting material; and
   a photocatalytic material,
   wherein the photoreflecting material and the photocatalytic material are provided on an outer surface of the air-permeable bag.

2. The protective bag according to claim 1, wherein the air-permeable bag is formed of a nonwoven fabric.

3. The protective bag according to claim 1, wherein the air-permeable bag is formed of fibers.

4. The protective bag according to claim 1, wherein the air-permeable bag has concave parts formed on the outer surface thereof.

5. The protective bag according to claim 1, wherein the photoreflecting material is colored fibers.

6. The protective bag according to claim 1, wherein the photoreflecting material contains first photoreflecting particles having a volume average particle size of 100 μm to 200 μm and second photoreflecting particles having a volume average particle size of 1 μm to 5 μm.

7. The protective bag according to claim 6, wherein the photoreflecting material contains at least one substance selected from the group consisting of metal, micaceous iron oxide, zinc oxide, titanium oxide, cerium oxide, Prussian blue, titanium dioxide-coated mica, molybdenum white, and lithopone.

8. The protective bag according to claim 1, wherein the photocatalytic material is apatite, where the apatite contains a metal atom necessary to have a photocatalytic activity and the metal atom is titanium (Ti).

9. The protective bag according to claim 1, wherein the photocatalytic material is apatite, where the apatite is calcium hydroxyapatite represented by $Ca_{10}(PO_4)_6(OH)_2$.

10. The protective bag according to claim 1, wherein a mass ratio of the photoreflecting material to the photocatalytic material is 3:7 to 5:5.

* * * * *